(12) United States Patent
Suyeyasu et al.

(10) Patent No.: US 9,245,066 B2
(45) Date of Patent: Jan. 26, 2016

(54) METHOD AND APPARATUS FOR OPTIMIZING AND SIMPLIFYING THE ENFORCEMENT OF BUILDING ENERGY EFFICIENCY REGULATIONS

(71) Applicant: CodeCycle LLC, San Francisco, CA (US)

(72) Inventors: Daniel Suyeyasu, Oakland, CA (US); Kimberly Goodrich, Oakland, CA (US)

(73) Assignee: CodeCycle LLC, San Francisco, CA (US)

( * ) Notice: Subject to any disclaimer, the term of this patent is extended or adjusted under 35 U.S.C. 154(b) by 344 days.

(21) Appl. No.: 13/778,213

(22) Filed: Feb. 27, 2013

(65) Prior Publication Data

US 2013/0226546 A1  Aug. 29, 2013

Related U.S. Application Data

(60) Provisional application No. 61/603,767, filed on Feb. 27, 2012.

(51) Int. Cl.
*G06F 17/50* (2006.01)
*G06Q 50/08* (2012.01)
*G06Q 50/06* (2012.01)
*G06Q 50/26* (2012.01)

(52) U.S. Cl.
CPC ............ *G06F 17/5004* (2013.01); *G06Q 50/08* (2013.01); *G06Q 50/06* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 6,785,592 B1* | 8/2004 | Smith et al. | 700/291 |
| 7,831,628 B1* | 11/2010 | Silva et al. | 707/802 |
| 2003/0040934 A1* | 2/2003 | Skidmore et al. | 705/1 |
| 2004/0102937 A1* | 5/2004 | Ibrahim | 703/2 |
| 2005/0222889 A1* | 10/2005 | Lai et al. | 705/9 |
| 2006/0185275 A1 | 8/2006 | Yatt | |
| 2006/0224358 A1* | 10/2006 | Loyd et al. | 702/182 |
| 2008/0249756 A1* | 10/2008 | Chaisuparasmikul | 703/13 |
| 2009/0112369 A1* | 4/2009 | Gwerder et al. | 700/277 |

(Continued)

FOREIGN PATENT DOCUMENTS

| | | |
|---|---|---|
| JP | 2003216715 A | 7/2003 |
| JP | 2006098361 A | 4/2006 |
| WO | 2013130627 A1 | 9/2013 |

OTHER PUBLICATIONS

"Int'l Application Serial No. PCT/US2013/028046, Search Report mailed Jun. 21, 2013", 3 pgs.

(Continued)

*Primary Examiner* — Kibrom K Gebresilassie
(74) *Attorney, Agent, or Firm* — Kwan & Olynick LLP

(57) ABSTRACT

A system for enforcing energy regulations is described. The system helps building departments maximize energy savings from the energy regulation enforcement process. The system is configured to optimize enforcement given a fixed level of enforcement resources within a building department. Optimization is achieved through the use of building science and sampling systems to structure building-by-building specialized inspection lists, which are delivered to building inspectors. Information collected during the inspection process is used to determine amounts of money that can be saved via complying or not complying with specific provisions of the energy regulations.

18 Claims, 12 Drawing Sheets

(56) References Cited

U.S. PATENT DOCUMENTS

| | | | |
|---|---|---|---|
| 2009/0210081 A1* | 8/2009 | Sustaeta et al. | 700/99 |
| 2010/0286937 A1* | 11/2010 | Hedley et al. | 702/60 |
| 2011/0029341 A1* | 2/2011 | Muse et al. | 705/7 |
| 2011/0231320 A1* | 9/2011 | Irving | 705/80 |
| 2011/0246381 A1* | 10/2011 | Fitch et al. | 705/313 |
| 2012/0150707 A1* | 6/2012 | Campbell et al. | 705/34 |
| 2012/0323637 A1* | 12/2012 | Cushing et al. | 705/7.36 |
| 2013/0144546 A1* | 6/2013 | Brackney et al. | 702/61 |
| 2013/0151179 A1* | 6/2013 | Gray | 702/62 |
| 2013/0158728 A1* | 6/2013 | Lee et al. | 700/286 |
| 2014/0107851 A1* | 4/2014 | Yoon et al. | 700/291 |
| 2014/0141290 A1* | 5/2014 | Pizzurro et al. | 429/50 |
| 2014/0149300 A1* | 5/2014 | Hubbell et al. | 705/317 |
| 2014/0222394 A1* | 8/2014 | Drees et al. | 703/2 |
| 2015/0032479 A1* | 1/2015 | Schembari et al. | 705/4 |

OTHER PUBLICATIONS

"Int'l Application Serial No. PCT/US2013/028046, Written Opinion mailed Jun. 21, 2013", 7 pgs.

"Int'l Application Serial No. PCT/US2013/028046, Preliminary Report on Patentability mailed Sep. 12, 2014".

* cited by examiner

METHOD AND APPARATUS FOR OPTIMIZING AND SIMPLIFYING THE ENFORCEMENT OF BUILDING ENERGY EFFICIENCY REGULATIONS

CROSS-REFERENCE TO RELATED APPLICATIONS

This patent application claims priority under 35 U.S.C. §119(e) to U.S. Provisional Patent Application Ser. No. 61/603,767, filed Feb. 27, 2012 and titled, "Method and Apparatus for Optimizing and Simplifying the Enforcement of Building Energy Efficiency Regulations," which is incorporated by reference in its entirety and for all purposes.

FIELD OF THE INVENTION

This invention generally relates to building construction, and more particularly to energy regulation enforcement for newly constructed buildings.

BACKGROUND

Building energy efficiency regulations (also referred to as "Energy Regulations") ensure that buildings are constructed in the best interest of future building owners and tenants, as well as in the best interest of the environment. More efficient buildings have lower utility bills and use less fossil fuel. As building energy regulations move to make buildings ever more efficient, the regulations are requiring more sophisticated building components, construction methodologies, operational sequences, system testing, and other elements. Further, building energy regulations themselves are becoming complex. For example, a set of energy efficiency regulations for a particular government jurisdiction can include up to 50,000 provisions.

Because of the complexity of current energy regulations, building departments have difficulty properly enforcing the regulations. The enforcement problem is heightened by constrained building department resources. For example, many building inspectors do not have the time or resources to become well versed in the requirements of building Energy Regulations.

During enforcement of building energy regulations, inspectors allocate their time to different enforcement tasks. To the extent that priorities are made during enforcement, they are often based on the ease of understanding for a given provision and each inspector's particular history with enforcing various provisions. Thus, enforcement of the energy regulations is not consistent. Further, enforcement prioritization is not presently based on energy savings, as the respective energy value of different regulatory provisions is rarely known by building inspectors. Thus, presently, all energy regulation elements are treated as if they are of equal value during the enforcement process.

The haphazard and uneven nature of energy regulation enforcement misses potentially great opportunities for energy savings. Not knowing what is important, inspectors spend too much time inspecting building components and enforcing associated regulations which will have little impact on energy savings and too little time inspecting building components and enforcing regulation which potentially have a great impact on energy savings. In view of the above, new methods and apparatus are needed for enforcing building energy efficient regulations.

SUMMARY

Building energy efficiency regulations create mandates for the performance of many of the energy consuming components of a building, such as the building envelope, lighting, equipment, and HVAC systems. Compliance with efficiency regulations is undermined by their complexity. There are few, if any, private sector tools to assist building officials with the energy code enforcement process.

Methods and apparatus for improving the enforcement of building energy efficiency regulations are described herein. In particular, building officials, such as building inspectors, can use the methods and apparatus in their enforcement of building energy efficiency regulations. In addition, utilities and jurisdictions can also use the methods and apparatus to reduce demand on utility networks, reduce carbon dioxide emissions, and reduce the cost of ownership for buildings by improving compliance with the energy regulations.

One aspect of the methods and apparatus described herein is related to a method for enforcing building energy regulations in an electronic system. The method can be generally characterized as comprising, 1) receiving by a processor an energy model for a building, 2) determining by the processor inspectable building elements for the building using the received energy model; and for each inspectable building element, a) determining by the processor first energy values associated with compliance to one or more the building energy regulations and b) second energy values associated with non-compliance to the one or more building energy regulations. Based upon the first energy values and the second energy values, the method can further comprise determining an amount of energy saved and a value of the amount of energy saved. The value of the amount energy saved can be used as part of a system revenue model for an energy regulation enforcement system.

In particular embodiments, the method can further comprise, generating a list of inspectable building elements where the list can be prioritized based upon the first energy values and the second energy values related to compliance energy regulations. Further, the list can be prioritized according to a time available to a building inspector. To implement prioritization, the method can further comprise determining amount of inspection time needed to perform an inspection of each type of inspectable building elements. An inspection list can be generated from a subset of the prioritized list of inspectable building elements. In addition, one or more inspectable building elements can be randomly selected and added to the inspection list.

The method can further comprise providing the inspection list to a building inspector, such an inspector utilizing a mobile device during a field inspection. Then, the method can further comprise receiving first information related to an inspection of one or more of the inspectable building elements and based upon the first information determining a first value of a compliance score associated with enforcing the building regulations. When second information related to the inspection of the one or more inspectable building elements is received, a second value of the compliance score can be generated. In one embodiment, information related to an inspection can involve receiving answers to one or more hierarchal questions associated with a first inspectable building element and based upon the answers determining whether the first inspectable building element complies with an energy regulation.

In particular embodiments, the method can further comprise receiving information related to a building component actually installed in the building and determining an energy value for an inspectable building element based upon the received information. Further, the method can comprise comparing the energy for the inspectable building element to an energy value determined prior to receiving the information.

Based upon the first energy values and the second energy values determined for each of the inspectable building elements, a total energy saved for the building can be determined. A value of the total energy saved for the building over a time period can be determined. In one embodiment, the total energy saved can provide a basis for compensating an operator of a system for enforcing energy regulation compliance. For example, a fraction of the total energy saved can be provided as compensation to the operator.

BRIEF DESCRIPTION OF THE DRAWINGS

The included drawings are for illustrative purposes and serve only to provide examples of possible structures and process steps for the disclosed inventive systems and methods for providing services to remote clients. These drawings in no way limit any changes in form and detail that may be made to the invention by one skilled in the art without departing from the spirit and scope of the invention.

DESCRIPTION OF THE PREFERRED EMBODIMENTS

Figure 1:
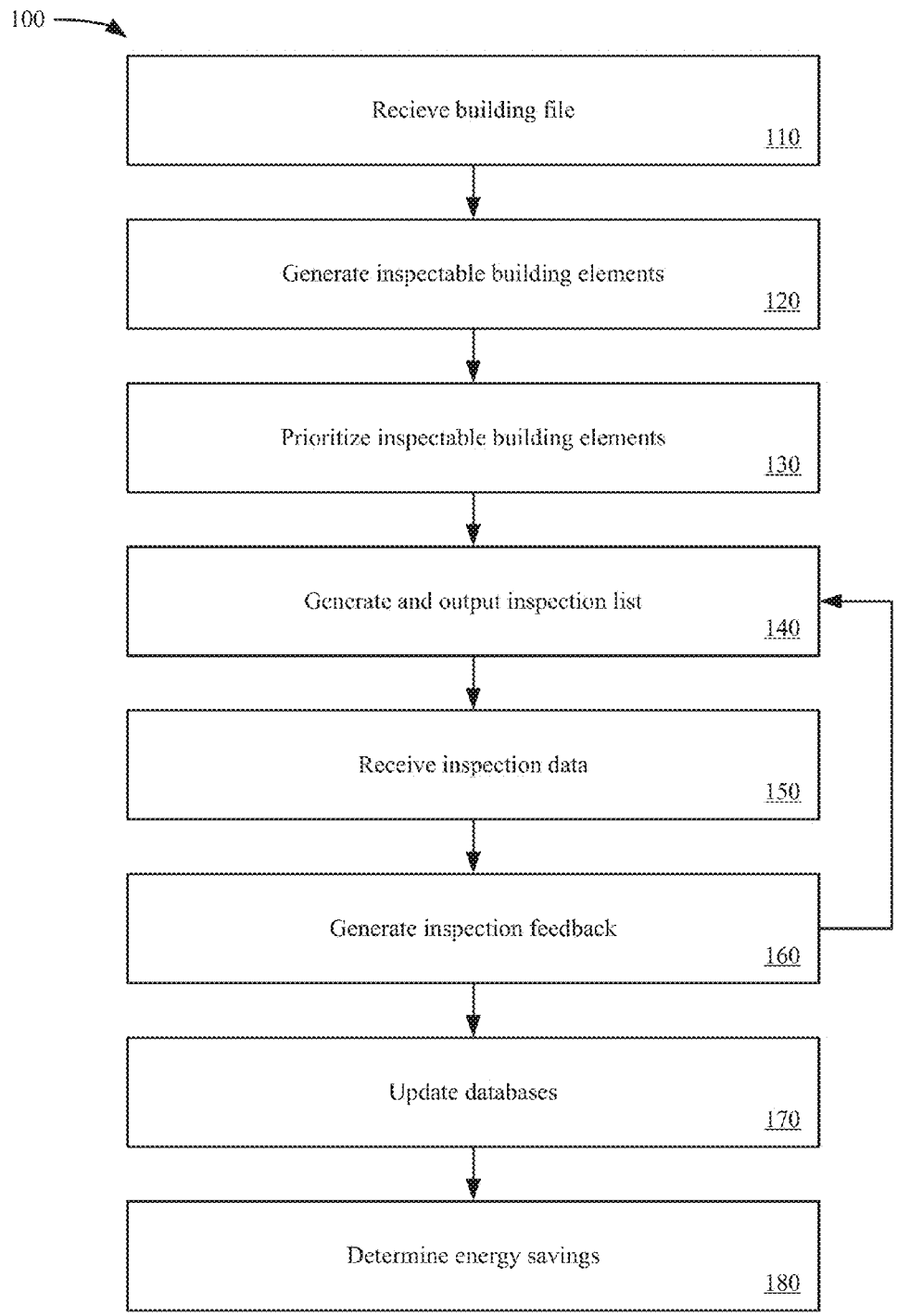
FIG. 1 is a flow chart of a method for enforcing energy regulations in accordance with the described embodiments.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A system for enforcing building energy regulations is described. The system can help building departments maximize energy savings from the energy regulation enforcement process. It is configured to optimize enforcement given a fixed level of enforcement resources within a building department. The enforcement resources are often, but not always, the amount of inspection time allocated to a particular building project. Optimization can be achieved through the use of building science and sampling systems to structure building-by-building specialized inspection lists. The prioritized enforcement lists can be delivered to building officials and to the team responsible for constructing a building. The enforcement lists can be used to establish clear energy regulation enforcement or compliance pathways.

Information on the energy attributes of a building are often delivered to inspectors at the scale of a whole building, in a list format, such as a schedule of all window fixtures within a building. This approach is distinct from most information delivery in the building trades that integrates building elements into a visual representation of the building layout and or building structure. The presentation of inspection information as an undifferentiated list makes the inspection process difficult to complete in a definitive manner and impedes the ability of jurisdictions to conduct enforcement through sampling mechanisms.

In view of the above, the system is configured to identify the building elements set for enforcement within a particular building location. The system can be configured to display the building elements in a "plan view" or through other visual representations of the building element's location and function such that the inspection process is simplified for the inspector. For example, a plan view can be generated for each floor of a multi-floor building as part of user interface for a mobile device. The elements shown in the plan view can be user-selectable, such as by the building inspector, to bring up information used in the system-proscribed inspection process.

During the inspection process, data on installed building elements can be collected. The collected data can be used to assess the overall rate of compliance for the building in regards to the energy regulations. The linking of building elements to particular spaces within the building can be used to structure a sampling sequence within the enforcement process. For instance, lighting systems can be inspected in 5 out of 40 rooms within a building to establish a regulation compliance rate.

The system can include measurement and verification protocols which document the energy that is saved via improved compliance with the energy regulations via using the system. Further, feedback on the amounts of energy and money that are implicated by complying or not complying with specific provisions of an energy regulation can be generated and sent to building inspectors, project teams, and government agencies. Using the collected compliance data along with data collected through other mechanisms like building energy meters, the system can be configured to determine the energy that is saved through improved regulatory compliance and those savings can be tied to a compensation amount by utility or government contracting partners for. The compensation process can occur through policy frameworks such as decoupling that permit compensation for improving energy efficiency.

In more detail, with respect to FIG. 1 a flow chart of a method for enforcing energy regulations is described. The flow chart provides an overview of the method. Details of the method are described with respect to FIGS. 2, 3, 4 and 5. For example, a method for generating inspectable building elements is discussed with respect to FIG. 2. A method for prioritizing inspectable building elements with respect to their energy efficiency is described with respect to FIG. 3. A method for generating an inspection list is discussed with respect to FIG. 4. The inspection list proscribes an energy enforcement pathway prioritized according to energy regulation compliance.

Figure 5:
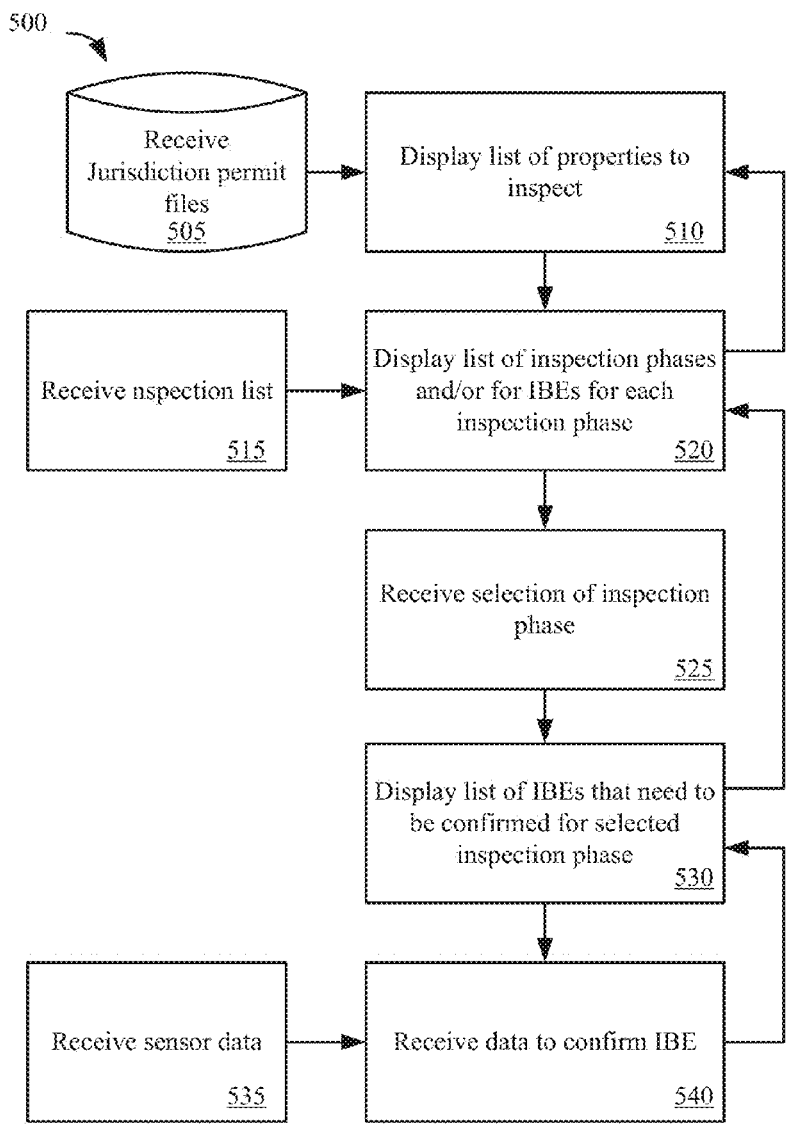
FIG. 5 is a flow chart of method for delivering an inspection list to building inspector in accordance with the described embodiments.
Figure 6:
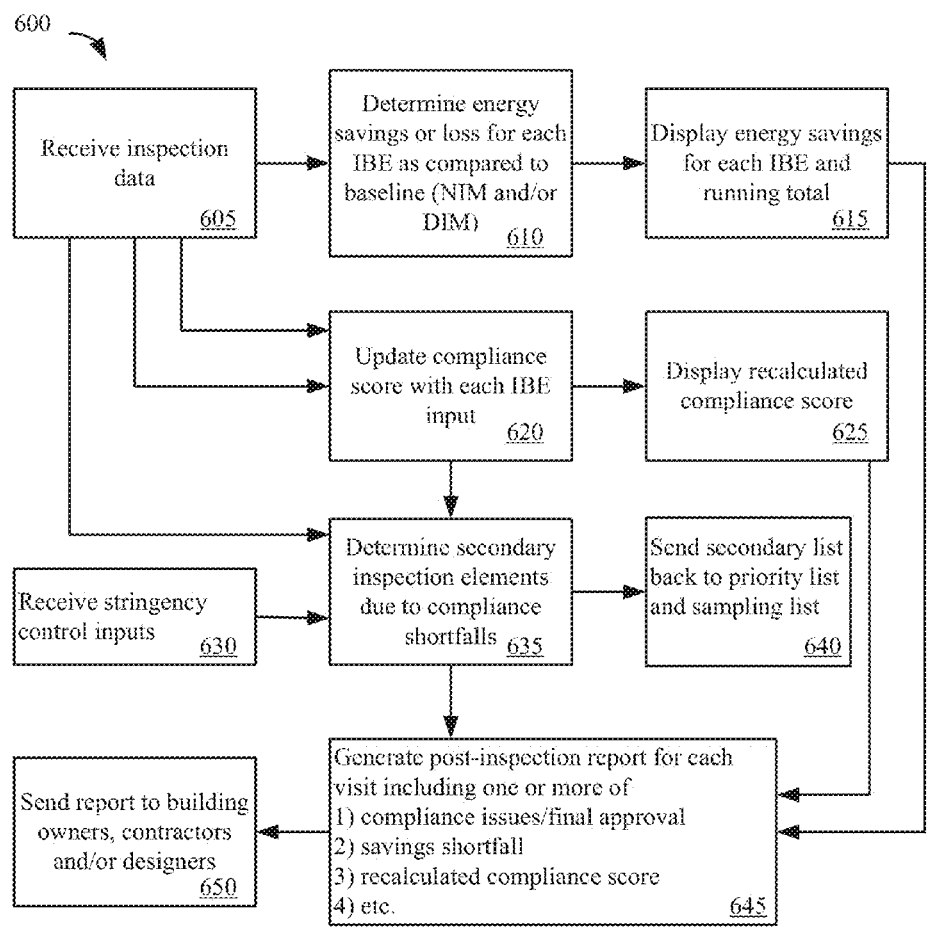
FIG. 6 is a flow chart of method for providing inspection feedback to building inspectors and project teams based upon inspection results in accordance with the described embodiments.
Figure 8A:
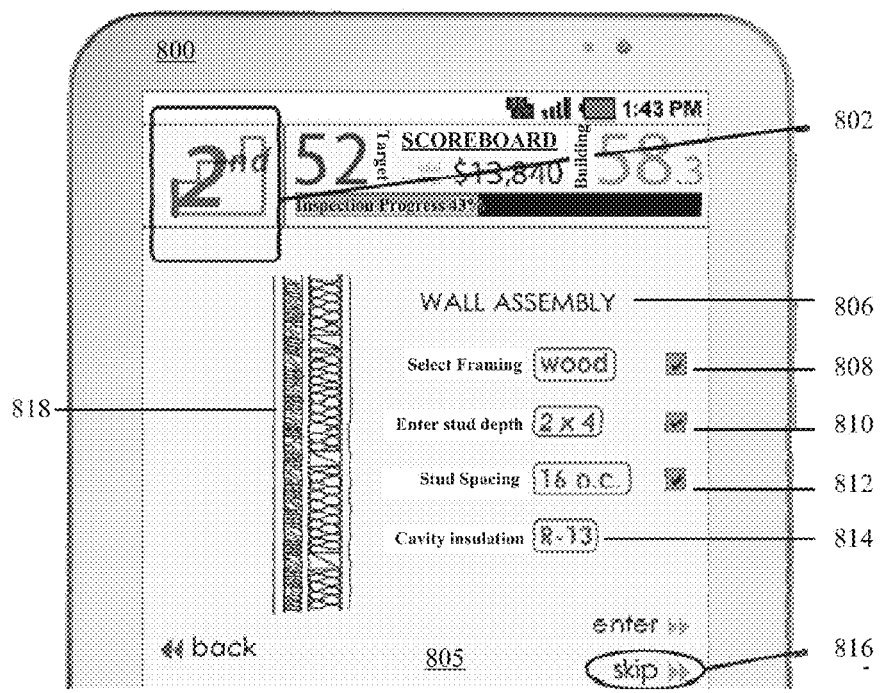
FIGS. 8A, 8B, 8C and 8D are screen shots of mobile device generating an energy regulation enforcement interface in accordance with the described embodiments.
Figure 8B:
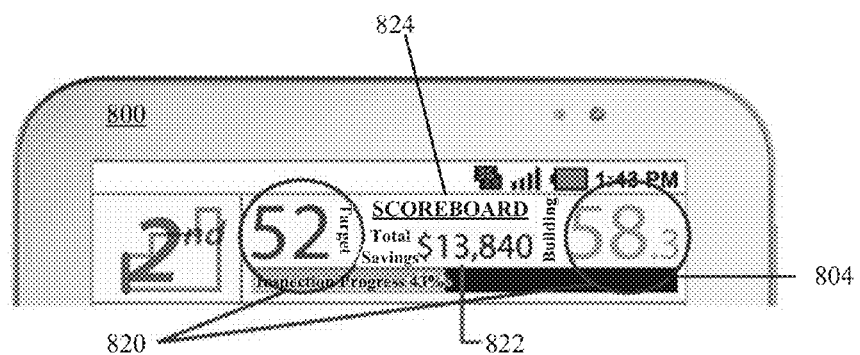
Figure 8C:
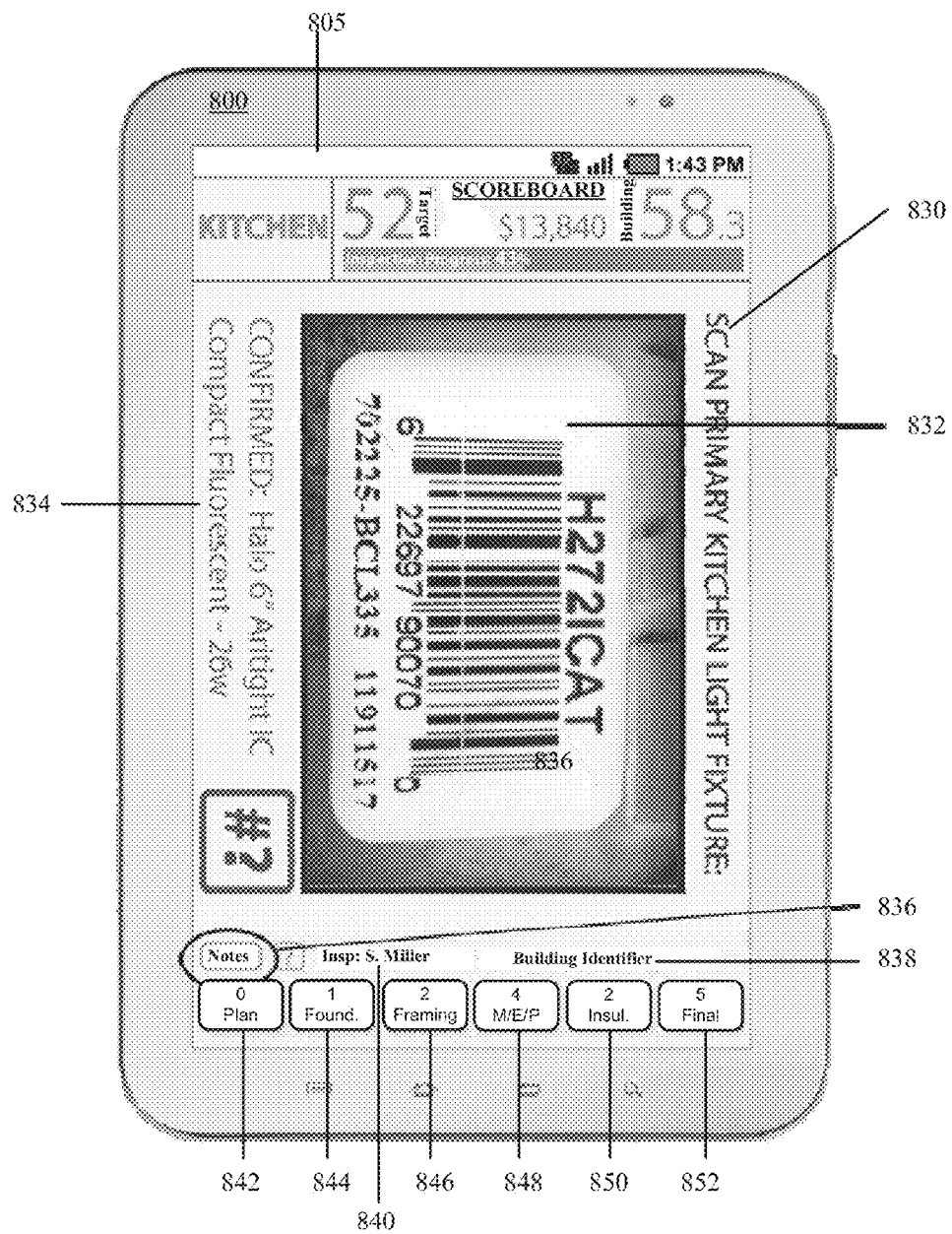
Figure 9:
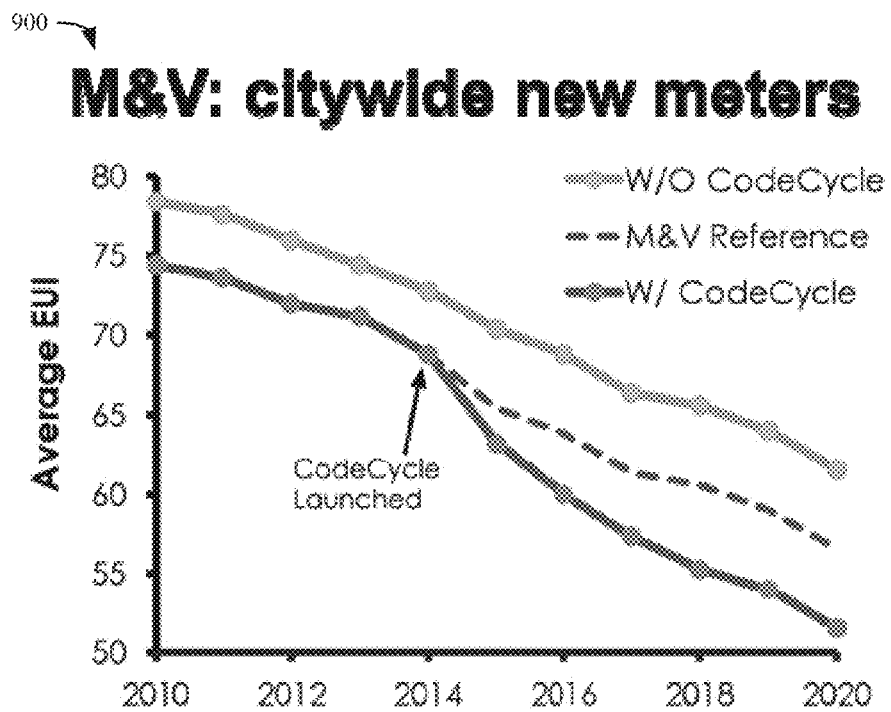
FIGS. 9, 10 and 11 are plots of energy usage intensity versus various parameters for determining energy savings using the system in accordance with the described embodiments.
Figure 10:
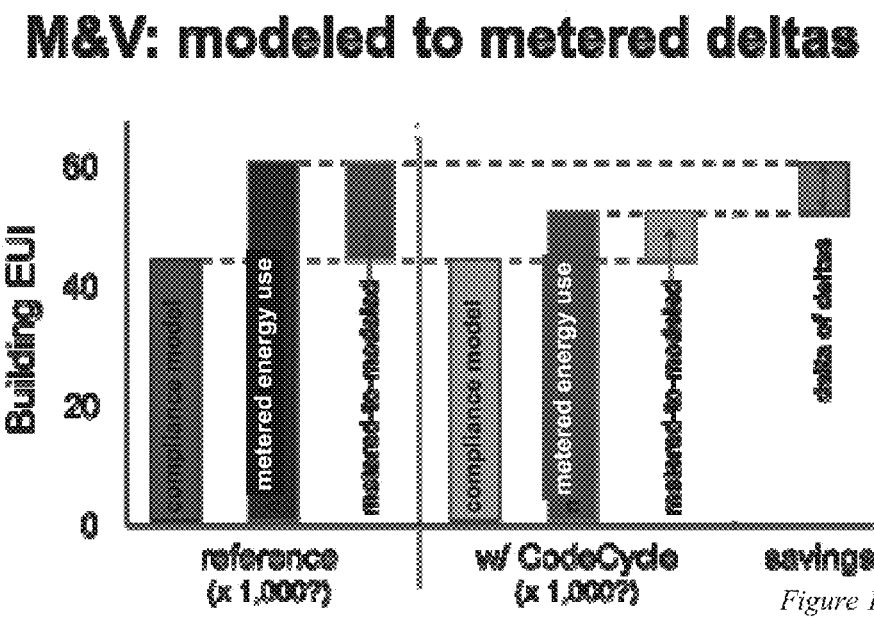
Figure 11:
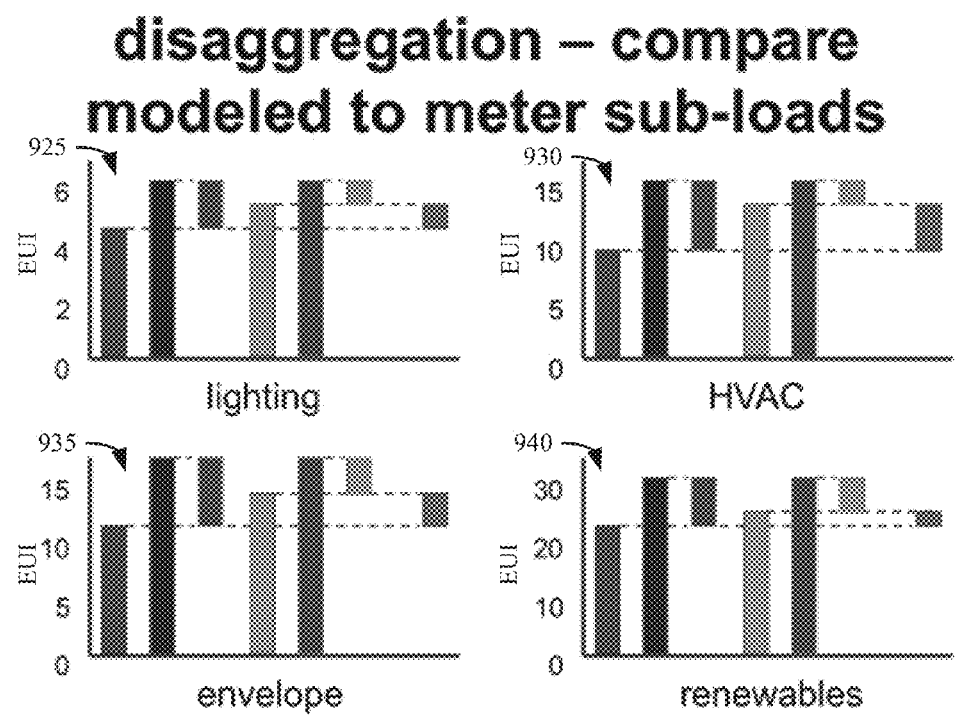

With respect to FIGS. 5 and 6, methods for delivering an inspection list to building inspector and providing inspection feedback to building inspectors and project teams based upon inspection results are described. One type of feedback is potential energy saving resulting from complying or not complying with particular energy regulations. With respect to FIG. 7 a system and associated system components for enforcing energy regulations are discussed. With respect to FIGS. 8A, 8B, 8C and 8D, an energy regulation enforcement interface for a mobile device is described. Finally, with respect to FIGS. 9, 10 and 11 plots of energy usage intensity versus various parameters that can be used to determine energy savings using the system are discussed.

System Overview

Next, an overview of the system is provided with respect to FIG. 1. In one embodiment, the system can be described as providing six features: 1) the ability to prioritize elements of a regulation that are the most beneficial to enforce on a given project, 2) a system for optimizing the enforcement of energy regulation elements within a jurisdiction using sampling rules, 3) the ability to decipher the internal logic of an energy regulation (the system can be compatible with different energy regulations that vary according to jurisdiction), 4) the ability to deliver to the building inspector information on what aspects of a regulation must be confirmed in a building in a clear manner, at the right time and in-situ, 5) the ability to provide feedback to building inspectors on how the as-Built condition of the building affects the overall compliance with the energy regulation and 6) the ability to retain data on each building constructed including both as-designed building energy specifications and as-built building energy specifications. As-Built refers to the attributes of a building found in the actual structure, post-construction. As-Designed refers to the attributes of a building found in the design drawings of the building and/or in the building regulations that mandate certain construction practices. The team responsible for constructing the building will be provided much of the same information as the building inspectors to make the construction and compliance process easier, with the primary exception being that the construction team will not know what inspectable building elements will be specifically enforced via a sampling methodology. Other features can also be included with system and the examples above are provided for the purposes of illustration only and are not meant to be limiting.

FIG. 1 is a flow chart of a method 100 for enforcing energy regulations for a particular building that can be implemented by the system. An energy regulation can be law or regulation adopted by a jurisdiction having authority over the building construction process that mandates the elements of a building that must be installed to achieve the energy efficiency objectives of the jurisdiction. Regulations may be imposed at multiple levels of government, such as city and state, but their collective effect is the energy regulation for a given building. Energy Regulations may include appliance efficiency regulations. Further, the energy regulations can include a number of provisions.

In 110, an electronic building file can be received. The building file can include electronic description of a building that is to be analyzed in light of a set of energy regulations. If additional information is needed, the system can be conditioned to query a user for the information. Additional details about this step are described with respect to FIG. 2.

In 120, inspectable building elements are generated from the input data, such as the electronic data including in the building file. The Inspectable Building Elements (IBE) are building components that are examined for energy regulation compliance. IBEs can consolidate functionally related attributes of a building, such as layers of a wall assembly, as well as similar systems that exist in different locations, such as all walls with the same layers of the wall assembly. Additional details about this step are described with respect to FIG. 3.

In 130, the IBEs can be prioritized. Inspectors have a limited amount of time to carry out an inspection. Based upon compliance or non-compliance with the energy regulations, potential energy savings can be determined for each IBE. The potential energy savings can be used to determine an order in which to examine the IBEs. Typically, the IBEs which offer the greatest potential energy savings when in compliance with the energy regulations versus not in compliance can be prioritized over IBEs which offer little energy savings when in compliance versus not in compliance.

In 140, an inspection list including an order in which to inspect the IBEs can be generated and output. In one embodiment, the list can be output to a mobile device, such as a mobile device carried by an inspector. Using the mobile device, the inspector can perform an inspection in the field in accordance with the inspection list. Additional details of prioritizing and generating an inspection list are described with respect to FIG. 4. One example of outputting the inspection list involving a mobile device is described with respect to FIGS. 8A, 8B, 8C and 8D.

In 150, inspection data can be collected. For example, an inspector can gather data that documents compliance of an IBE that has been installed in a building. To gather this information, the inspector may sample some fraction of components associated with the IBE in a building. For example, the inspector may examine some fraction of light fixtures installed in a building to make an estimation if all of the light fixtures, some fraction of the light fixtures, or none of the light fixtures may be in compliance with associated energy regulations. The system can be configured to generate the fraction of components to be examined and/or their locations for the sampling. If the number of components associated with the IBE is small, then all of the components can be examined as opposed to sampling a fraction of the components.

The number of components that are sampled for an IBE can affect the amount of time needed for the inspection of the IBE. Thus, a sample size may vary depending on the prioritization and how much time an inspection of each component requires. Additional details related to gathering inspection data are described with respect to FIG. 5.

In 160, the system can generate inspection feedback. For example, estimated energy savings based upon the compliance factors determined from the inspection can be generated and provided as feedback information. A particular visit may allow only a portion of an inspection to be carried out. For example, certain building components may only be available for inspection at early stages in the building process while other building components may only be available for inspection later in the building process. In one embodiment, the compliance factors determined associated with a first inspection can affect the generation of a subsequent inspection list as multiple inspections are carried out on a building. Details of generating an inspection feedback are described in more detail with respect to FIG. 6.

In 170, information from each building inspection process can be stored. For example, building energy model data and inspection inputs can be used to update various databases maintained by the system. The energy model data can be used by an energy model engine. An energy modeling engine can refer to the algorithms and the software to implement the algorithms which estimate the energy use of various components of a building. The energy modeling engine can use building specifications input into the energy modeling engine and a specified weather file for the location of the building to simulate energy usage of the building on a component by component basis.

In 180, the energy savings resulting from using the system can be determined Details of further methods and apparatus for estimating energy saved via using the system are described with respect to FIGS. 9, 10 and 11. The further methods and apparatus for estimating energy saved may use data recorded from energy meters for buildings that were built using the system, in some cases comparing that data to data recorded from energy meters for buildings that were built not using the system. In one embodiment, the energy savings can be used to determine an amount of funds to be paid for use of the system. For example, the amounts of funds paid can be a fraction of the cost of the energy saved by the system.

Creating Inspectable Building Elements

Figure 2:
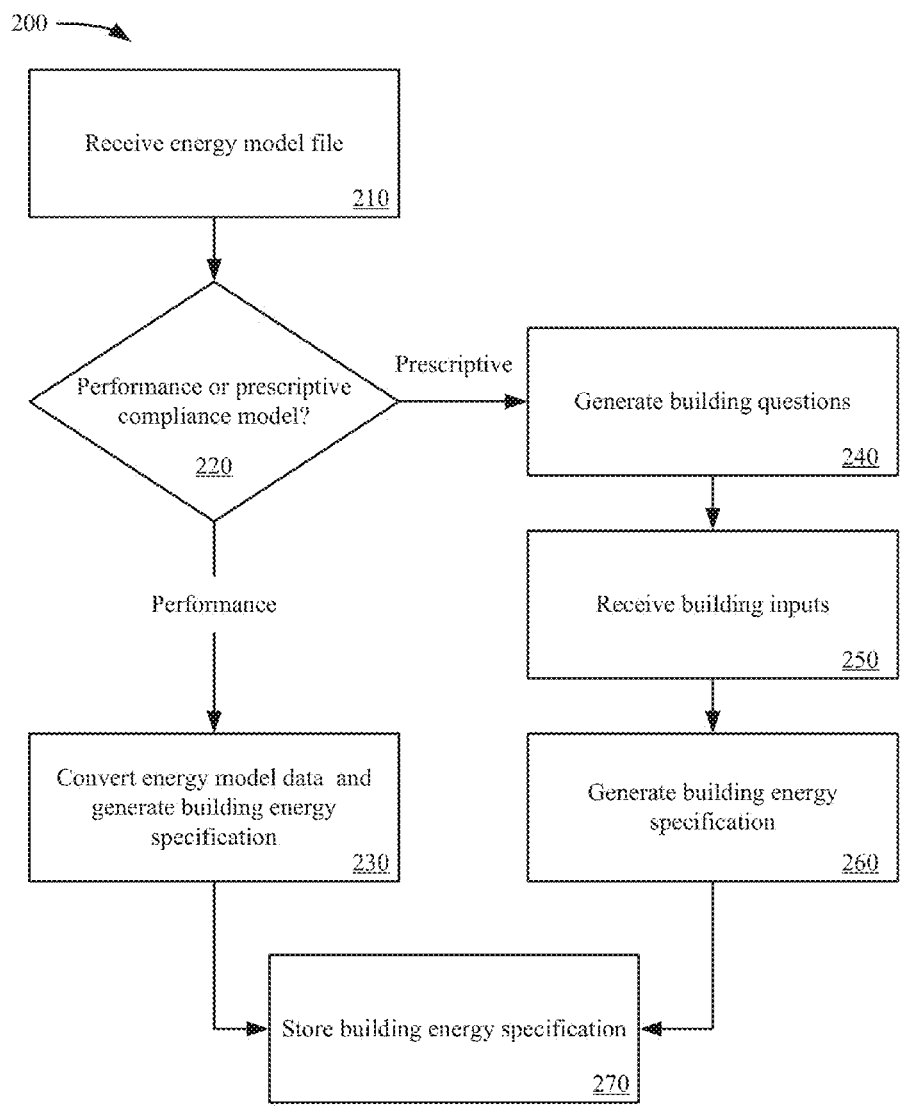
FIG. 2 is a flow chart of a method for generating inspectable building elements in accordance with the described embodiments.

Next, with respect to FIGS. 2-6, some additional details of the steps shown in FIG. 1 are discussed. FIG. 2 is a flow chart of a method 200 for generating IBEs. When a project is submitted to a building department to receive building permits, the entity seeking permits can, at some time in the compliance process, submit data from the Building Energy Specification (BES) for the building in a designated system format. The building department can be the regulatory branch of a jurisdiction that is charged with ensuring compliance with building energy regulations. The building energy specification can be a computer file that documents a given set of building attributes so that the energy use of a building or a subcomponent of a building may be estimated using an energy modeling engine.

In 210, the energy model file can be received by the system. The format if the file can be gbXML, Industry Foundation Class (IFC), or another format, such as proprietary format, designated by the system. The system can include a number of interfaces for receiving the data. For example, the data can be submitted through the building department interfaces 735 or project team interfaces 745 linked to the computers hosting the system (see FIG. 7).

In 220, the system can determine whether a performance or a prescriptive compliance model is to be utilized. In a prescriptive compliance method, a project may comply with the energy regulations by assuring that the attributes of the building match, on an attribute-for-attribute basis, the requirements of the energy regulations. Compliance via the prescriptive method generally does not involve the use of energy modeling during the design phase. In a performance compliance method, a project may comply with energy regulations by using an energy modeling engine to show that the building, as-designed, will use no more energy than a reference building that is set by law as the appropriate comparison point for compliance via the performance compliance method. In one embodiment, as described below, a hybrid model can be utilized.

In 230, when a performance model is used, input data in 210 can be converted through translation tools to a system BES format if needed. The system BES format can be used by the energy modeling engine. For project teams that are seeking building permits but wish to comply with the regulation via the prescriptive path, in 240, the system can request fundamental information about the building. This fundamental information might include the purpose of the building, the square feet, the number of floors, the window-wall-ratio, a characterization of the air conditioning system, a characterization of the heating system, and a characterization of the domestic hot water system. In 250, the system can receive the inputs.

In 260, the system can use the input information, and the specifications outlined in the energy regulations to develop an energy model for the building compatible with the energy modeling engine. For example, the model auto-generation process can use rules from common design practice such as default floor-plate ratios (e.g. 2:1), default ceiling heights (e.g. 8' for residences), and default roof slope (e.g. 4:12 for residential) to distribute the known information about a building across a building energy specification sufficiently detailed to analyze via an energy modeling engine. In 270, the building energy specification that is generated via either the performance method or the prescriptive method can be stored by the system.

Hybrid submissions can involve use of a combination of a performance approach and a prescriptive approach, such as those using an envelope tradeoff procedure. The hybrid submission can use a combination of the two system energy model development processes. The hybrid approach can use an automatic model generation process to generate building energy specifications consistent with prescriptive requirements. However, the building energy specification can be altered to be consistent with the attributes described in the performance based subcomponent of the compliance process.

Under either prescriptive or performance compliance submittal mechanisms, the system may request additional information of the project team to facilitate the enforcement process. For instance, some location information on building systems is not needed by compliance energy modeling tools to complete compliance calculations but is needed by inspectors to confirm building attributes using a sampling protocol. The system can include input mechanisms to collect these additional attributes of the building energy specification.

Methods for Prioritizing Inspectable Building Elements

Figure 3:
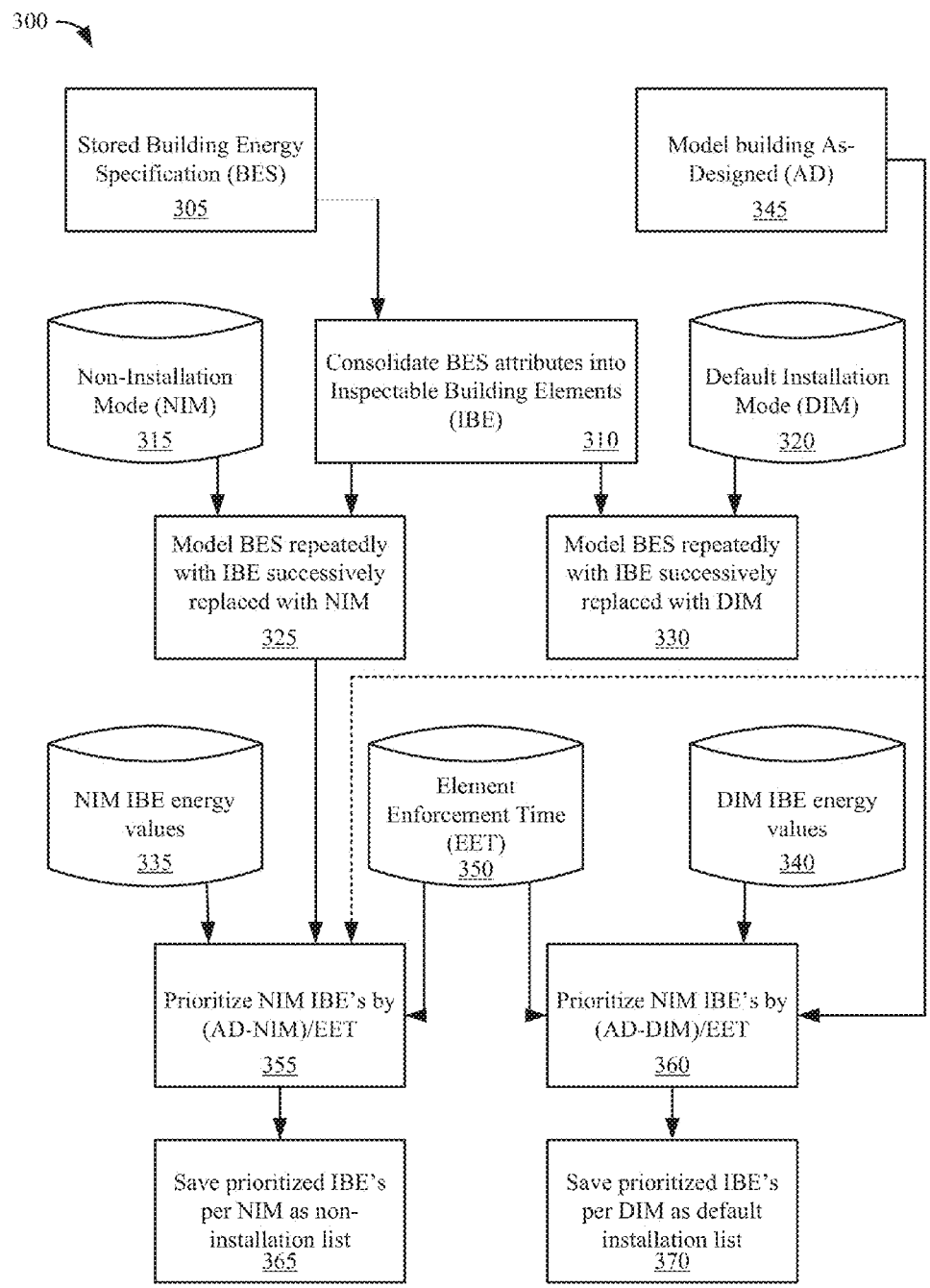
FIG. 3 is a flow chart of a method for prioritizing inspectable building elements with respect to their energy efficiency in accordance with the described embodiments.

Next, prioritization of the building elements is described. FIG. 3 is a flow chart of a method 300 for prioritizing inspectable building elements with respect to their energy efficiency. Once a full building model is created and stored in 305, the system can start prioritizing the building elements which can be inspected as a part of the energy regulation enforcement process. The building elements to be prioritized can be a combination of those analyzed in the energy model and those required for a building but not explicitly incorporated into an energy model (e.g. mandatory occupancy sensors on certain lighting systems). Energy data associated with the elements not incorporated in the building energy specification can be stored in databases 335 and 340.

In 310, the system can sort the building attribute information into groups of building attributes which can be compared, for inspection purposes, as a group. In various embodiments, this sorting can be driven in part by building physics, in part by design practice, and in part by the manner in which a building inspector reviews a building. For example, all opaque walls with the same framing type, framing depth, framing spacing, cavity insulation and continuous insulation can be included as one building element type, referred as an Inspectable Building Element (IBE). Minor variations that have little effect on the overall performance of a system can be consolidated into a single IBE. A building energy specification can have multiple instances of the same type of IBE, such as for a building with two distinct air conditioning systems.

In a particular embodiment, some consolidation of attributes can also be performed to accommodate the sampling needs of inspectors. In one such example, all lighting systems within a single room can be grouped for collective inspection, with the lighting components in some other rooms not inspected as a part of the same sampling protocol. As described above, sampling can involve some fraction of the components associated with the IBE.

In a particular embodiment, in 345, the building can be modeled in the as-designed condition to establish a baseline for the prioritization process. As-designed can refer to attributes of a building found in the design drawings of the building and/or in the building regulations that mandate certain construction practices. The output of the modeling—for the baseline comparison and all other runs—can be whichever metrics the client and/or user wishes to optimize. For example, site kBtu, source kBtu that also encompasses the wasted energy necessary to make and distribute electricity, time dependent composite energy metrics such as California's Time Dependent Valuation, cost, cost in accordance with time of use schedules, electricity demand, or a combination of these or other metrics can be optimized. Thus, the system can be configured to accept user selections of metrics to optimize.

In one embodiment, a number of separate databases can be established for all possible IBEs. A first database 315 can include the status of all IBEs that are expected in a building which have a minimal possible level of energy efficiency features. Database 315 can be developed via professional judgment and can contain such attributes as walls without cavity insulation, a furnace with a lowest available efficiency level on the market, and for commercial buildings T12 fluorescent lighting without any advanced controls. The level of IBE quality represented in this database is known as the Non-Installation Mode (NIM).

In more detail, the NIM can refer to the manner in which a building component would exist if there were no compliance with the building energy regulations. For example, for a parameter such as furnace efficiency, the NIM value is not 0%, but instead is the minimum efficiency value of a furnace that is available on the market. NIM is one example of a baseline that can be used for comparison purposes in the embodiments described herein. Other baselines can be specified and the concept of NIM is used for the purposes of illustration only.

A second database 320 can include the status of all IBEs consistent with average building practice absent active energy regulation enforcement in a given building Database 320 can be populated through studies of building conditions for recently completed structures, via professional opinion, and other databases that are available. The level of IBE quality represented in this database is referred to as the Default Installation Mode (DIM). As buildings are inspected using the system, the data collected from that inspection process can be used to refine the values recorded in the DIM database to keep the database current with evolving default construction practices.

In more detail, DIM can refer to the manner in which a building component would most likely be installed absent active enforcement of energy regulations in that specific building. It can be location specific and vary from region to region. Thus, multiple DIM databases can be provided for different locations and a system input can be the location of building which can be used by the system to select an appropriate database to use. Even for components that are binary in nature, such as vacancy sensors, the DIM for that component can be 60% installed if that is how often the component is likely to be found in a context where it is required.

A third database 350 includes an estimate of the time required to enforce an IBE. In various embodiments, the time can be a fixed number or a formula that uses other building attribute data to calculate the total time for inspecting the IBE 350. This enforcement time is referred to as the Element Enforcement Time (EET). Different enforcement times may be utilized depending on the phase of inspection process. For example, the time required to inspect IBE's during a plan check can be different than the time required during a field inspection. Thus, the system can be configured to generate inspection lists based upon a phase in the inspection process, the time allocated for inspection during the phase and the time needed to inspect each type of IBE during the phase.

In one embodiment, the system can collect information on the time it takes building inspectors to make successive inputs through the use of the inspection interface (see FIGS. 7, 8A-8D) to continually refine the EET associated with each IBE. For example, during the plan check phase, the system can receive inputs regarding the time used to verify different elements which can be used to update database 350. Whereas, during the field inspection phase, the system can receive inputs, such as from a mobile device, which are used to determine the time used to inspect various IBEs in the field. This information can be used to update database 350.

Other databases besides the NIM 315, DIM 320 and EET 350 are possible and these examples are provided for the purposes of illustration only. In some embodiments, NIM 315, DIM 320 and the EET 350 databases including the estimate of time to enforce an IBE can be jurisdiction or region specific. Thus, the system can be configured to utilize a first combination of databases in a first jurisdiction and a second combination of databases in a second jurisdiction. The system can be configured to accept jurisdictional information that allows the system to select a specific set of databases to utilize which are compatible with the jurisdiction. In addition, the system can be configured to accept user inputs that allow a particular combination of databases to be specified for an analysis. In other embodiments, both the NIM database 315 and the DIM database 320, as well as any other reference databases to be used by the system, may contain multiple values for each IBE distinguished by building type, climate zone, and other variables where warranted which can be utilized by the system for different analyses.

In one embodiment, in 325, to create a prioritized list of energy regulation attributes, the system can generate a series of comparative energy modeling runs, shifting one IBE from the As-Designed (AD) condition to the condition of the comparable NIM for each run. In the following run, the prior IBE is returned from the NIM condition to the AD condition and then the next IBE is shifted from the AD condition to the NIM condition. In each run, all attributes but one can be in the AD condition. In other embodiments, multiple attributes in combination can be run outside of the AD condition when the combinations of attributes affect one another to generate a higher order analysis. The series of comparisons for each IBE can provide information that demonstrates the value of ensuring that the IBE is properly installed as compared to no installation at all (NIM). Various comparison values can be determined by assessing the difference in energy use (or other metric) between the NIM model and the AD model.

Similarly, in 320 each IBE from the AD condition can shifted to the installation level represented by the DIM for that respective IBE. Once again, in each run all attributes but one can be in the AD condition. The difference in measured energy between the AD model and the DIM model for each IBE can be used to demonstrate the energy value of ensuring that the IBE was properly enforced, as compared to installation through the average mode in the industry.

In a particular embodiment, two prioritized lists can created for the series of IBEs for the building. Each list can contain all IBEs for the building. The order of prioritization through this embodiment may be created by dividing the savings associated with each NIM or DIM comparison with the associated EET for that IBE. This process produces a prioritization with respect to the energy (or other metric), which can be saved, per unit of enforcement time. In FIG. 3, (AD-NIM)/EET and (AD-DIM)/EET, represent the determination of the values used to perform the prioritization.

In a particular embodiment, in 355, one list can be created for all NIM comparisons. The prioritized list can be referred to as the Non-Installation List, or NIL. The NIM list is saved in 365. In 360, a second list can be created for all DIM comparisons (known as the Default Installation List, or DIL). The DIL is saved in 370. Other prioritization algorithms can be used to optimize resources other than available building inspector time or to optimize the use of available inspector time in a different manner and these examples are provided for the purposes of illustration only. Thus, additional or alternate lists can be generated depending on the comparisons used to determine the energy savings.

Values can be added to both the NIM and DIM prioritization lists for IBEs that are not modeled through the system's energy modeling engine using databases 335 and 340. For instance, regulation requirements for a pool cover are one such example of an IBE that may not be modeled through the system's energy modeling engine. To account for energy saved by inspecting the pool cover for energy regulation compliance, the pool cover can be assigned a fixed energy saving value based on climate and/or the size of the pool, and that value can be used in the prioritization process when compared to the time necessary to confirm the presence of the pool cover (the pool cover EET). Values for the NIM and DIM conditions can be added to databases 335 and 340 and used in the prioritization processes in 355 and 360.

Along with the prioritization of building features based on the building features comparative energy value, the system can also be configured to use the data embedded in the building energy specification to determine which provisions of the energy regulation are applicable to specific components of the building and which provisions of the energy regulation are not applicable to a specific component of the building. For instance, the size of a given room (also known as a "space") within a commercial building could be used to determine whether the lighting system for the room is required to be linked to a daylight sensor that turns off the lighting system when there is ample natural light in the room.

Inspection List Generation

Figure 4:
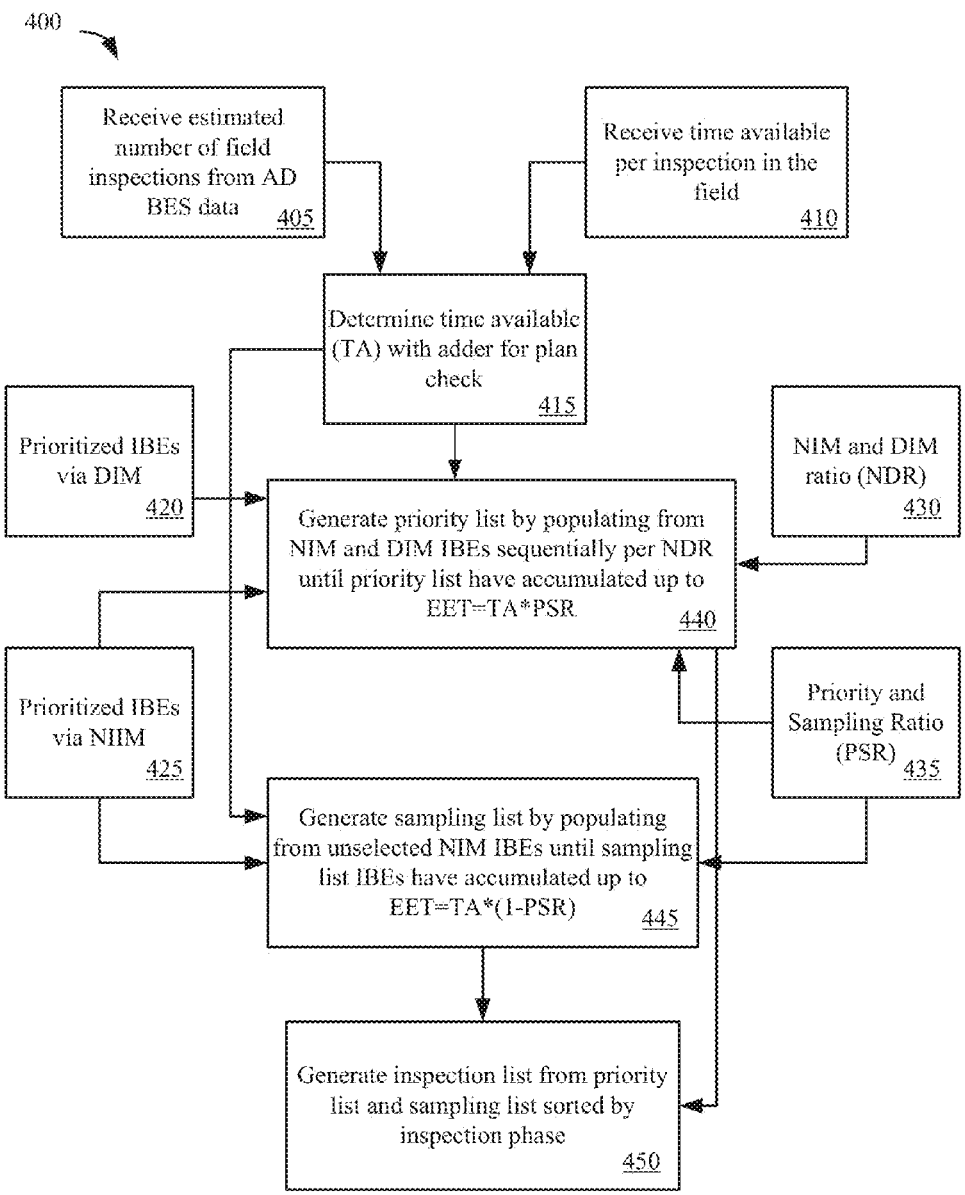
FIG. 4 is a flow chart of a method for generating an inspection list in accordance with the described embodiments.

Next, additional details of generating an inspection list are described. FIG. 4 is a flow chart of a method 400 for generating an inspection list. The inspection list can be generated using a number of parameters and generated data, such as but not limited to i) the estimated number and types of inspections from the As-=Designed BES data in 405, ii) the time available per inspection in the field, iii) the prioritized IBEs via the DIM comparisons in 420 and iv) the prioritized IBEs via the NIM comparisons in 425. As described above, the prioritized list of IBEs can be generated using other comparison methodology besides NIM and DIM and this example is provided for the purposes of illustration only.

In one embodiment, the system can include four primary controls. The controls can be used to translate the prioritization lists, such as the NIM and DIM lists generated in FIG. 3, into an Inspection List (IL) that sets forth the IBEs to be inspected within a building or during the plan check phase. Various individuals can utilize the system controls, such as a system operator providing a system service, a client paying for using the system or an entity having authority over the enforcement process. Other controls can be added for further refinement of the inspection process and the following description is provided for the purposes of illustration only.

A first system control function can be used to allocate the amount of time to be spent on energy regulation enforcement in an average site inspection in 410. This time can be referred to as the Time Available per Inspection. In 415, to determine the total Time Allocation (TA) for energy regulation inspection, the system can multiply the time available per inspection by the number of expected field inspections received in 405. The allocated field inspection time can be supplemented with allocated time for the plan check phase, at a predetermined ratio known as the plan check multiplier. In one embodiment, the number of expected field inspections can be estimated from information in the building energy file.

A second control can be used to set the level of stringency for the enforcement process (e.g., see 630 in FIG. 6). The second control can be referred to as the Stringency Control. The stringency control can be used to establish what level of non-compliance still equates to the approval of permits. The stringency control can also be used to set what level of secondary inspections are required by the system when initial inspections find attributes that are noncompliant (see 635 and 640 in FIG. 6). Such secondary inspections might or might not be associated with the subject of the initial IBE that was found to be non-compliant.

A third control can be used to set the ratio, during the generation of the inspection list, between IBEs chosen purely through a ranked prioritization process and those chosen through a randomized sampling process. Both processes provide value in maximizing enforcement effectiveness. A parameter, referred to as the Prioritization/Sampling Ratio (PSR), can be used to emphasize a selection of IBEs from prioritization or randomization. In 435, the PSR can be adjusted to achieve different goals of the regulation enforcement process. In one embodiment, the PSR input can be expressed as the percentage of the inspection list that comes from the prioritization process alone as compared to the whole size of the inspection list (prioritization plus sampling), i.e., the total number of elements of the inspection list resulting from the prioritization process and those resulting from random sampling.

A fourth control can be used to set the ratio, during the production of the inspection list, between attributes selected from the NIM based prioritization list received in 425 and from the DIM based prioritization list received in 420. This parameter can be referred as the Non-installation Default-installation Ratio (NDR). In 430, the system can receive a value of the NDR. As described above, other lists different from the DIM and NIM lists or in addition to the DIM and NIM lists can be generated and then subsequently utilized to generate the inspection list. In other embodiment, other parameters can be specified to affect the selection of elements of from these lists when the inspection list is generated.

In this example, in 440, the inspection list for a given project can be populated by harvesting IBEs from the non-installation list and the default installation list in accordance with the parameters set forth in the four controls outlined above. IBEs can be selected, in alternating fashion corresponding to the NDR received in 430, using the non-installation list and default inspection list received in 420 and 425, respectively. The NDR can be implemented by way of the number of IBEs utilized from each list. As IBEs are added to the inspection list, the total inspection time is accumulated from the EET for each IBE. Repeat IBEs that populate the inspection list (i.e. a non-installation list entry matching a default installation list entry) can be merged to a single entry on the inspection list. In 440, this process can proceed until the accumulated EETs equal the TA multiplied by the PSR. The NDR and PSR can be adjusted and the process repeated if the user wishes to adjust the composition of the inspection list.

In 445, the remainder of the TA determined from (1−PSR) can be utilized by randomly selecting IBEs from the remaining IBEs on the non-inspection list from 425. The system can keep track of the IBEs selected in 440 such that the previously selected IBEs are not reselected in 445. The IBEs can be added until the accumulated EET of the randomly selected IBEs, added to the accumulated EET of the prioritized IBEs, equals the total TA. In 450, the overall inspection list including the contributions from 440 and 445 can have both plan check and field check IBEs. In some instances, particular IBEs can be set for inspection at both the plan check phase and in the field check phase.

In the process described above, the IBEs on the inspection list are selected according to their prioritized savings and through a randomized sampling process. In another embodiment, these two approaches can be combined, such that all IBEs are randomly selected, but measures with greater projected savings per EET receive greater weight in the selection process, making those IBEs much likelier to be selected. The energy modeling, comparison process, prioritization, and list building can occur in the system central control unit 705, the energy modeling system 710, and the prioritization/sampling system 715, with reference between those components and the reference databases 720 as described in FIG. 7.

Inspection List Delivery

Next, methods and apparatus for delivering the inspection list in a possible format used in the inspection process are described with respect to FIG. 5, which is a flow chart of method 500 for delivering an inspection list to a building inspector. The building inspectors can be staff employed by a building department. The inspectors can be contracted to a building department, or separately entrusted by a jurisdiction to ensure compliance with building energy regulations. The inspector can include, but is not limited to, individuals who work on plan checking and field checking.

A combination interfaces configured for use on mobile and non-mobile computing devices can be used to deliver the inspection list to the inspection team. These interfaces can also be used to receive data gathered during the inspection process and generate feedback information. In various embodiments, a mobile computing device can be a smartphone, tablet, netbook, laptop or other mobile computing device that allows for the interactive display and input of information. The devices can include functions, such as the capabilities to transmit data over the cellular telephone networks and to record sound and pictures. Details of one example of a mobile computing device configured to generate an interface for delivering an inspection list are described in FIGS. 8A, 8B, 8C and 8D.

In 515, the inspect list can be received. Then, the inspection list can be sorted into phase used in the inspection process. These phases can include "plan check", "foundation and subfloor", "framing", "insulation", "mechanical, electrical, and plumbing", and "final inspection", but might involve other sequencing approaches. The inspection list sorted and organized according to phase can be output in 520. When an inspector is looking at inspection elements for the plan check phase, the information can be presented either on a computer or a mobile platform interface. The plan check phase can be subdivided into building components, such as envelope, HVAC, lighting, and others. When an inspector is using the system for field inspections, the information can be delivered on a mobile platform.

In 510, the system can receive information on one or more properties to inspect from the integrated permit management system in 505. Then, the system can receive a selection of a particular property. Based upon the selected property, the system can output inspection details for the property. The system can save inspection details, such that the next time the property is visited an inspector the inspection can continue. Thus, using this system, different inspectors can carry out the inspection process without repeating inspection work previously carried out.

In one embodiment, using information gathered from prior inspections (completed items on an inspection list) and inputs from any integrated permit management system 505, the system can anticipate what phase of the inspection process is to be completed on a site visit in 520. In 525, the inspector can confirm that the anticipated phase is the one to be inspected or can select other phases that can be inspected. Multiple phases can be inspected during a single site visit, and a single phase can be inspected over multiple site visits.

Once a phase is selected, in 530, the system can present to the inspector a list of the IBEs to be inspected during that site visit. The inspector may then accept the list, reduce the list if necessary, or reorder the list if reordering the list can make the inspection process more convenient. In one embodiment, the system can be configured to present and save user-selectable parameters which affect how a list is presented. The system can be configured to record any reductions to the list for record keeping purposes. This information can be used to change how a list is generated if the system generated list is consistently being reduced. Further, the system may recommend that more time be allocated to the inspection process to allow for completion of the tasks on the list.

Figure 8D:
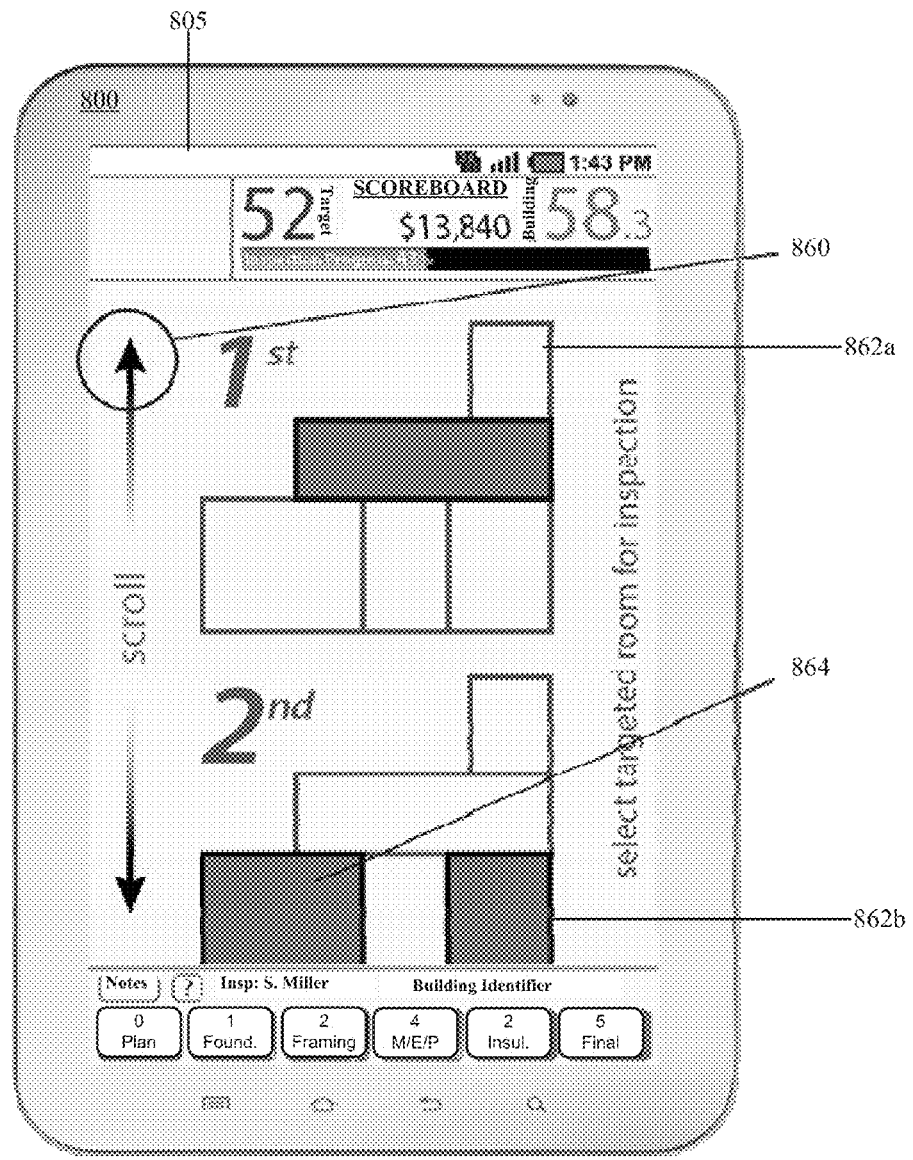

In one embodiment, via an interface, the list can be presented as a series of tasks or may be presented through the highlighting of rooms, walls, or other physical locations within plan view outlines of the floors of the building (or vertical sections of the building), with the highlighting indicating areas within the building where the IBEs reside (e.g., see FIG. 8D). In 540, once an IBE for an inspection visit has been accepted from the inspection list, the system can commence to ask questions of the inspector to confirm that each IBE in question is properly installed. In one embodiment, the questions can be presented in an interface executed on a mobile device. The answers can be entered via the interface by selecting check boxes or using other mechanisms for making selections. Further, text entry boxes can be provided for free form entry of text.

In the interface, the questions may be multilayered, if required by the logic of the energy regulation itself, such that certain answers lead to distinct follow-up questions until compliance is either confirmed or denied. The numerous "exceptions" embedded in the energy regulations are one reason that the questions can be multilayered. This process can rely on the "Itemized and Structured Energy Regulation Database" discussed below.

In 540, for many questions, a "Skip" button might be present so that an inspector may move to a different question while indicating that they did not have the time or ability to answer the question. (e.g., see FIG. 8A). The button can be named something synonymous with "Skip" or graphically labeled to indicate that the item was not being inspected. The system can emphasize that accurate answers are more important to the compliance process than the total number of answers. The interface can be configured to allow the inspector to make notes during the inspection process to record compliance issues. Those notes may be input via typing data entry, voice recognition data entry, voice notes, written entries using a stylus, and through associated photos or videos.

In 535, the system can allow for automatic entry of data using one or more sensors or recording devices. For example, many products that are inspected can include bar-codes or other optically formatted data. The system can be configured to receive the bar-code, determine what product is associated with the bar-code and determine whether the product is in compliance or non-compliance with the energy regulations. In another embodiment, the system can be configured to request an image be recorded of an inspected component. Further, the device can be configured to record other sensor data. The gathered information can be stored and later recalled if problems are found with the building. The information can be used to determine whether the problem was identifiable during inspection process or developed afterwards.

In more detail, in 535, the camera on a mobile platform can be used to scan barcodes on installed equipment to confirm that the equipment matches specifications in the building energy specification. Items whose specifications can be confirmed through barcodes include furnaces, light fixtures, occupancy sensors, etc. The system can be tied to a database of such equipment so that the compliance tool can quickly assess equipment specifications and compare those specifications to requirements of a regulation. The system can use the specifications gathered through the barcode scanning process to reassess the projected energy use in the building, as is further described in the section describing scoring.

Other sensors can be used with the system such as temperature sensors, pressure sensors, light sensors, distance finders, etc. These sensors can be embedded in objects or can be attachments that are coupled to the mobile platform. In some embodiments, data from such sensors can be communicated to the mobile platform via a wireless communication methodology such as Bluetooth. For example, the system can communicate with smart meter data collection systems to detect and interpret shifts in power use in the building Those power usage shifts can be tied to test events in the building such as the turning on or off of a given amount of lighting to determine the overall power use of the lights that are turned on or off. In addition, the system can be configured to collect data from control systems in the building using wireless communications. Information to be collected from such control systems can include operational sequences to confirm that such settings match energy regulation requirements.

In one embodiment, the system can be configured to generate paper versions of information presented on the interface, such as an inspection list. Prioritized inspection lists can be generated on a per-building and per inspection phase level, including data entry areas on the forms that are machine-readable when filled with numbers or "X" marks. The data entry process can follow the same logic as in the electronic interface, following the requirements of the energy regulation. Each sheet of the paper forms can have a bar code, a QR code and/or other computer readable markings that can allow system to input the data into a project file when the pages are scanned through a scanning device and sent, as images, to the system for analysis and input. The received information can be used to generate subsequent inspection lists which are printed. The paper variation of the interface can include information on the monetary and energy value of confirming each IBE on the inspection list is properly installed in that building.

Compliance Scoring and Inspection Feedback

Next methods and apparatus for providing inspection feedback, scoring which indicates energy savings, are described. FIG. 6 is a flow chart of method 600 for providing inspection feedback to building inspectors and project teams based upon inspection results in accordance with the described embodiments. In one embodiment, the system regulation enforcement process can rely upon a scoring and user feedback system to better inform parties about the implications of the energy regulation enforcement process.

In 605, the system can receive inspection data for a particular project related to compliance/non-compliance with the regulations. In 610, the system can be configured to determine energy savings or loss for each IBE as compared to a baseline, such as a NIM or DIM baseline. In 615, based on the determined energy savings in 610, the system can be configured to output, such as to a display, energy savings for each IBE and/or a running total using the savings from all of the IBEs. The amount can be regularly updated as the inspection is carried out on various IBEs. In one embodiment, a baseline cost of the energy can be utilized and the energy savings can be represented as a dollar amount.

In addition, the system interface, both computer and mobile platforms, can also be configured to report to the inspector and the project team the dollar savings that are expected over the lifetime of an IBE for complying with the regulation. The energy savings can be calculated by comparing the modeled energy use of the building with the IBE properly installed as compared to the IBE installed in the Non-Installation Mode. The system can also report the lost savings due to compliance failures. Other savings calculation processes and other units of measuring savings and losses can also be used.

Based upon the received inspection data, in 620, the system can use a scoring system to provide regular updates on the level of energy regulation compliance when the building is compared to a compliance benchmark. The determined compliance score can be output to a system user, such as an inspector. An example of an interface including a compliance score and energy savings as a dollar amount are illustrated and described with respect to FIGS. 8A, 8B, 8C and 8D.

In one embodiment, in 620, the compliance scoring can use a regulatory baseline building such as that defined in the California Title 24 Alternative Calculation Method. The building being constructed, altered, or repaired can be compared to the baseline building through the use of the energy modeling engine. The performance of the baseline building could be equated with a fixed score, such as 50. The modeled energy use of the new construction can be compared to the modeled energy use of the baseline building. Next, the ratio of the two can be multiplied by the baseline building score to produce the score for the new construction. In this example, if the determined score is below 50, the building is in compliance. Other approaches to the same overall scoring methodology could be used on a jurisdiction by jurisdiction basis.

As building attributes are input into the energy model for the building from the plan inspection or the field inspection processes, the compliance score can be updated when As-Built conditions differ from any of the As-Designed conditions (which can include all mandatory regulation provisions). This scoring can give a project team and the inspector an indication as to when elements in the building do not match the elements on the plans at a sufficient scale to suggest overall noncompliance with the energy regulations.

In a particular embodiment, the system can be configured to suggest what level of energy efficiency improvements must be undertaken in the building to bring it back into compliance if there is non-compliance on some features. In 635, based upon the stringency control inputs received in 630, the system can determine secondary inspectable building elements to inspect due to the compliance shortfalls. In 640, the determined secondary inspectable building elements can be used to generate a subsequent inspection list as described above with respect to FIG. 4.

The jurisdictions having enforcement authority can determine how different elements of the regulation can be balanced in the scoring process. For instance, mandatory regulation measures might not be eligible for trade-off calculations through the scoring mechanism, or they could be a part of the scoring system but could be scored at an elevated level as compared to their projected energy use. The elevated scoring can require additional offsets beyond the direct energy cost of not fully complying with mandatory energy regulation measures. Thus, in general, compliance of different IBEs can be weighted different to come up with different compliance score formulations. The system can be configured to allow a user/organization to specify values for the weighting factors to produce a particular compliance score for a jurisdiction.

IBEs that are a part of the inspection list because they were randomly selected can, in the scoring system, represent other IBEs that were not selected using standard sampling and representation mechanisms. A failure to comply with such IBEs might not only require the correction of the noted non-compliant IBE, but might lead to the random selection of additional IBEs from the non-installation list which might also have to be inspected. The newly selected IBEs can then represent the remaining uninspected IBEs upon re-inspection. The number of supplemental IBEs that need to be inspected can be dependent, in part, on the level of stringency set for energy regulation compliance in the jurisdiction received in 630.

As regulation compliance is confirmed across multiple inspection phases, the energy savings for a building can be aggregated across the inspection process. Savings by inspector can also be aggregated across broader parameters, providing yearly total and lifetime totals. In 508 and 509, once an inspection visit to a building site is complete, or at the completion of plan check, the system can distribute notifications to the project team and to the building owner on issues of noncompliance, the lifetime cost of the noncompliance, expected remedial measures, and other useful information. A complete recalculation of the building's energy score can also completed at the conclusion of every inspection to assess the building's overall status in the energy regulation compliance process.

System

Figure 7:
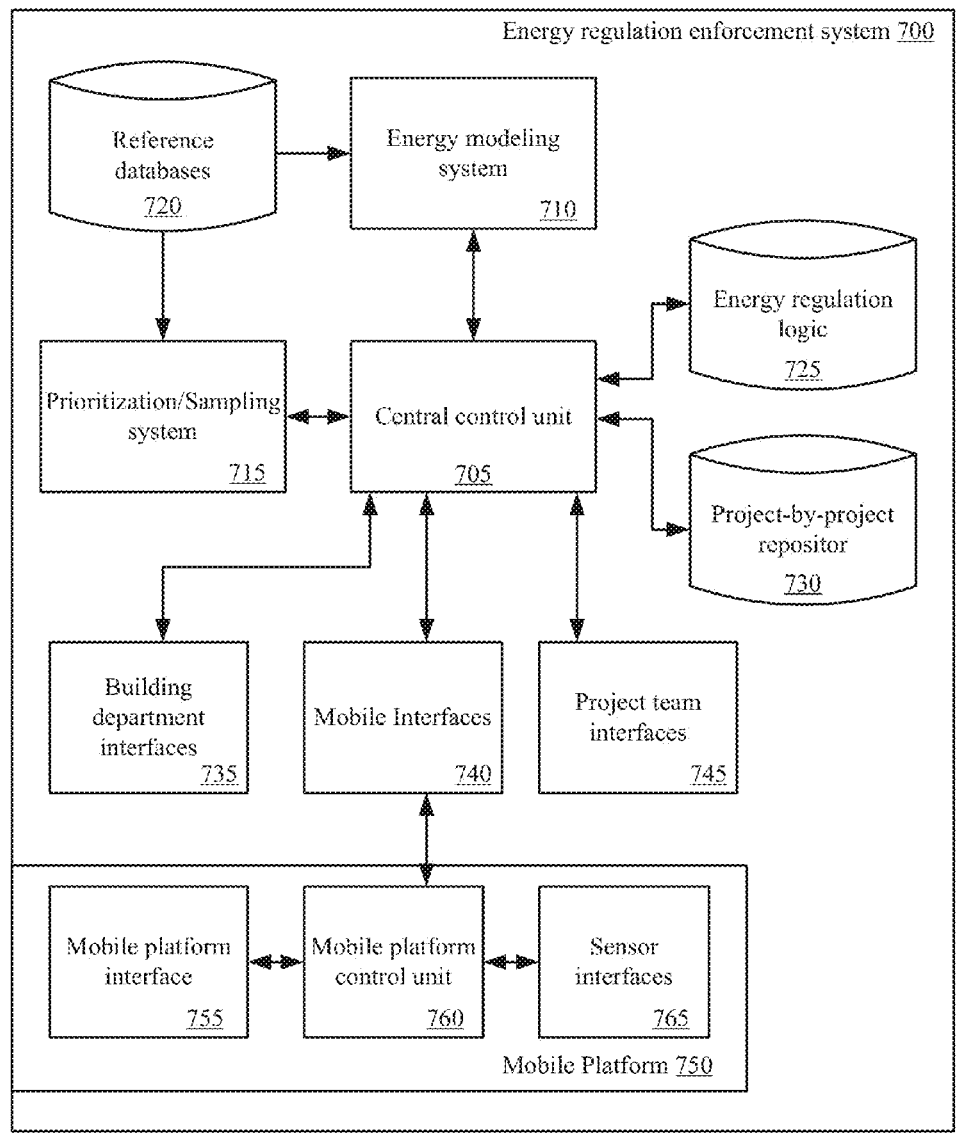
FIG. 7 is a block diagram of system for enforcing energy regulations in accordance with the described embodiments.

Next, details of a system for enforcement of energy regulations are described. FIG. 7 is a block diagram of system 700 for enforcing energy regulations in accordance with the described embodiments. In one embodiment, the energy modeling, comparison process, prioritization, and list building can occur in the central control unit 705, the energy modeling component 710, and the prioritization/sampling component 715 using the reference databases 720. The components can be instantiated on one or more servers, such as servers residing in the cloud.

The system can include a database, such as 725, for each jurisdiction that embodies the internal logic of the energy regulations. In one embodiment, the energy regulations, which the system helps to enforce, can be converted into a hierarchical database that structures all requirements embedded in the regulations as distinct questions that can be answered by a building inspector during the plan check phase or field inspection phase. The hierarchical database can differ for each regulation set that the system helps to enforce. Answers for any given question can lead to a few different conclusions: the attribute complies with the regulations, the attribute does not comply with the regulations, or more questions must be asked to determine compliance or non-compliance. If more questions must then be asked, those follow-up questions can be listed as a lower tier in the question hierarchy database and directly linked within the question hierarchy to the preceding question.

As described above, the system can retain all data from the inspection process for each building, including the original BES and any inputs from the inspection phases. This information can be stored in database 730. As described above, information stored in database 730 can be used to refine the models and data used in the system. For example, based upon actual inspection times in the field, new enforcement element time values can be determined as described above with respect to FIGS. 3 and 4.

The system can provide a number of interfaces that can be used to communicate with different devices, such as mobile devices 740, and different entities, such as building departments 735, field inspectors 740 and project teams. The system can be configured to output and receive data via the interfaces. The system can also include applications executing on a remote device, such as mobile platform control unit application executing on the mobile platform. As described above, as described as follows with respect to FIGS. 8A, 8B, 8C and 8D, one application executed on a mobile device can be used to generate a field inspection interface.

The interfaces, such as 735, 740 and 745, can be used to communicate different information to different groups. For example, the scoring and other feedback mechanisms can primarily be delivered through the mobile interfaces 740. For example, after receiving inspection data from the mobile platform 750, the central control unit can generate a score. The generated score can be sent to a mobile platform 750 in the field via interface 740. In addition, the information might be delivered through other channels to building owners, contractors, building inspectors, building departments, and other interested parties, via interfaces such as 735 and 745.

In another example, a distinct list of IBEs can be provided to the project team via 745. In one embodiment, the list can be prioritized by the level of energy savings from properly installing the IBE. The list provided to the Project Team may not include any sampling; i.e. for the project team all elements of the building that must comply with the energy regulations are presented in the inspection list for completion. A similar but different list, such as list including sampling, can be sent to an inspector using mobile platform 750.

The mobile platform can include the mobile platform control unit 760. It can execute an inspection application associated with system 700. In one embodiment, the unit 760 can generate an interface 755 that is output to a display. The interface can be configured to display information on various IBEs in an inspection list according to phase, receive inspection data and display inspection related compliance scores and energy savings. The sensor interfaces 765 can be used to receive data from various devices, such as bar-code reader coupled to the mobile platform, meter data from meters within a building or other sensing devices coupled to device or structures in a building or coupled to the mobile platform 750.

In other embodiments, the interfaces 735, 740 and 745 and the mobile platform can be used in acceptance testing, commissioning and third-party verification. It is no longer sufficient that energy efficiency elements be installed in a building; the elements must be installed to a certain level of quality to comply with energy regulations and must also be tested following installation. Acceptance Testing is the process by which a project team or another party, after a system is installed, runs a system through a series of tests to ensure that it is running properly.

The system can include an interface with data entry elements that set forth the acceptance testing procedures required by the energy regulations and can convey that information to building departments. The acceptance testing procedures can also be conveyed to the project team through the project team interfaces 745. Where appropriate, the system can require project teams to take pictures or video, using a mobile platform, of the acceptance testing process. Other inputs may also be required. The system can record the time and location of such photos and video using GPS and/or cellular data to minimize the submission of false documentation.

Additional inspections, sometimes by third parties, are sometimes required for energy regulation compliance issues. Those issues include duct leakage testing, commissioning, and other testing requiring special equipment or training. As with acceptance testing, the system can include data collection protocols for those inspection processes consistent with the energy regulation requirements. The data collection protocols can be implemented as components of a mobile device. In general, the system can be configured to handle the data management, data transfer, and data analysis for acceptance testing and other special inspections so that the data can be integrated with the building department inspection process.

In FIG. 7, the computer server system and mobile platform system can include a number of electronic devices with a processor and memories. The processors can execute coded instructions to carry out the various methods described herein. The coded instructions can be stored on a non-transitory computer readable medium. The computer readable medium can be any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

Mobile Interface

In this section, with respect to FIGS. 8A, 8B, 8C and 8D, a mobile device and associated interface, incorporating some of the features described above, is discussed. In particular, screen shots of a mobile device 800 different aspects of an energy regulation enforcement interface output to a mobile device display 805 are discussed.

In 802, building location information is shown. In this example, the term "$2^{nd}$" is shown to indicate IBEs on the second floor of a building are being inspected. Two dimensional and three-dimensional information relating to IBEs can be used to direct building inspectors to specific IBEs within the building during both the plan check phase and field inspection phases. In one embodiment, when the data in the building energy specification includes two dimensional or three dimensional representations of the building, a building plan view map on the system interface can be used to indicate which wall of the building, which internal zone, which room or which other defined location within a building a specific IBE can be located for inspection.

Two-dimensional information can be output in a plan view, elevation view, or cross-section view. Location based information can be delivered in a manner specific to the building being inspected, or it could be delivered in a universalized manner. As an example, building specific information can include a plan view layout of lighting systems within the building that matches the building's lighting plan. A universalized delivery mechanism may be the cross-section of a room showing the acceptable geometric relationship between photo-sensors, windows, and lighting fixtures. That universalized view might also be adapted to the specific known window sill height or other pertinent attributes of the room.

In various embodiments, as described above, location based information can be input into system either through the building energy specification or through specific inputs requested of a user, such as of the project team by the system. One example of the location based information may involve the defining of bounding boxes around lighting spaces (which are generally coincident with rooms in a building). Following the definition of a lighting space, specific lighting fixtures and lighting controls can be assigned to the space. The defined space and known attributes of the defined space can also be used to determine, through algorithmic interpretations of the energy regulations, what subcomponents of the energy regulations can be applicable to that space. Further details of location based information that can be output via the interface are described with respect to FIG. 8D.

Returning to FIG. 8A, in 806, a name of an IBE which is being inspected is displayed. In this example, the IBE is a wall assembly. A cross-sectional image 818 of the wall assembly is provided. Images, such as 818, may allow inspectors to confirm that the IBE being inspected matches the state of the IBE in the building energy specification.

In 808, the interface is configured to allow a user to select the type of framing that is being used. In this example, wood framing has been selected. In 810, the interface is configured to allow a user to specify a stud depth. In this example, a stud size of "2×4" is selected. In 812, the interface is configured to allow a user to specify stud spacing. In this example, "16 o.c." (or '16" on center') is specified. Finally, in 814, the interface is configured to allow a user to specify cavity insulation. In this example, an insulation value of "R-13" is specified. In 808, 810, 812, check boxes are provided which indicate to the user that the input data for the IBE matches the corresponding data for the IBE in the building energy specification.

In one embodiment, the system can include an operation mode (not shown) where a building inspector can access the IBE data input screen for a building attribute that is not specifically set forth on the IL. Inspectors that observe compliance issues with an IBE that is not called-out in the inspection list can, through this mechanism, input those observations into the system tool. The information input by the inspector can be saved to generate correction notices and revise the compliance calculations.

A skip button 816 is shown in FIG. 8A. For many questions, a "Skip" button may be present so that an inspector can move to a different question while indicating that they did not have the time or ability to answer the question. The button could be named something synonymous with "Skip" or graphically labeled to indicate that the item was not being inspected. The system can keep track of items not inspected so that the inspector can later return to the item.

The top portion of the display 805 in FIG. 8A is highlighted in FIG. 8B. The top portion includes an inspection scoreboard 824. The scoreboard 824 indicates an inspection progress amount, which is 43% in this example and two compliance scores 820. As described above, the system can use scoring formulations to provide regular updates on the level of energy regulation compliance when the building is compared to a compliance benchmark. Two scores are shown to indicate both the target score for the building and the in-progress score for the building as the inspection proceeds.

The scores are one example of feedback which the system can output to user. Another example, in 822, is the dollar and/or energy value resulting from complying with each IBE being enforced. As described above, this feedback information can be output on an IBE-by-IBE basis as well as a running total for all IBEs.

In FIG. 8C, a second state of the interface on the display 805 of the mobile device is shown. In 830, the system is requesting the user to scan the primary kitchen light fixture for an IBE. In one embodiment, the scanning is performed via a camera on the mobile device 805. In 834, after the scanned bar-code information has been processed by the system, a message is output indicating the item has been confirmed. In this example, the item is a compact fluorescent light.

A notes button 836 is shown on the interface. A user of the interface can make notes during the inspection process to record compliance issues. A selection of the notes button can cause the interface to generate an input interface, such as a free form text box or activate a microphone to record voice notes. In one embodiment, the interface can allow a user to take video images to document a compliance issue.

Additional inspection status information is output at the bottom of the display 805. In one embodiment, in 840, a name of the inspector is displayed. In addition, in 838, a building identifier is displayed. In one embodiment, the building identifier can be an address of the building.

As described above, the inspection list can be sorted according to phases and then output via the interface in a phase by phase manner. In the example of FIG. 8C, the inspection list is divided into six phases. The phases include plan check 842, foundation and subfloor 844, framing 846, mechanical, electrical and plumbing 848, insulation 850 and final inspection 852.

A selection of one of the phases can cause an interface state to be generated where the IBEs left to inspect for each phase are accessible. A number of IBEs left to complete in each phase are displayed. For example, in framing 846, two IBEs are left complete and in mechanical, electrical and plumbing ("M/E/P") 848, four IBEs are left to complete.

In FIG. 8D, another interface state is shown which includes floor plan maps for different floors of a building. In one embodiment, in 860, the user can scroll through floors in a plan view to see which rooms have been targeted by the system to have IBEs inspected. Two floor plans, 862a and 862b, for a first floor and a second floor of a building are displayed. A highlighted room, such as 864, can be selected by the user to then reveal the IBEs within that room that need to be inspected. Information on number and types of IBEs in each room can be displayed in this interface state.

For each floor, a collection of non-overlapping but abutting bounding boxes can be used to define the entire floor. As specific rooms are targeted for inspection, that room (or bounding box) can be highlighted while other rooms (or bounding boxes) are displayed with less prominence. Other methods may be used to distinguish the targeted room from other rooms comprising the floor.

In one embodiment, bounding boxes of spaces or other areas of interest can be generated as a digital overlay to an image view (e.g. .PDF, .JPG, .DWG etc.) of the pertinent submitted plans for the project. For instance, the third floor lighting plan view can be used as a base layer to "trace" the lighting spaces (or rooms) in a building. Those spaces can be used to interpret and enforce provisions of the lighting energy regulations. When a bounding box is later shown during the inspection process as a designated room for inspection, the underlying image (or "base layer") of the original plans corresponding to the bounding box can also be displayed in either a transparent format or as a toggled alternate view of the same space. Displaying the image of the plans used to input the light data illustrates the project team's original intent for the space and illustrates details as to the expected layout and/or attributes of IBEs.

Within the interface, the image of the submitted plans stored in the system can also be compared to the working drawings for the project to confirm that the plans used to establish the system inspection process are the same as those being used in the field to construct the building. The same comparison can be made during plan check to help assure conformance of the submitted plans with the building energy specification.

In additional embodiments, other layers of information for a particular 2D space can exist within the tool, such as a schematic simplification of the lighting for a space. The user of the system tool can shift between the schematic visualization of IBEs and the parallel expression of the same information via the display of the submitted plans.

The location information provided by the interface can be used to help inspectors locate IBEs for inspection and to set practical sequencing processes for the inspection of individual IBEs during a given inspection visit, minimizing inspection time. In one embodiment, the 2D and 3D information can also be used to display pertinent energy flows through the building in a manner that demonstrates the relative scale of energy use by various IBEs.

In listing the designated IBEs for a given inspection, some floors might have no rooms, walls, or other attributes highlighted if the sampling mechanism does not queue any IBEs from those floors. In one manifestation, images of all floors are displayed by system in sequence so that the user can see where IBEs need to be inspected. The floors can be reviewed and then selected by scrolling through them in a vertical or horizontal manner by an action such as touchscreen swiping. Up and down arrows could be displayed and then selected in another manifestation. For example, selecting the third floor through either mechanism is how the user would indicate that they wished to inspect elements on the third floor. In response, the third floor can then be isolated within the navigation screen, with the ability to select subcomponent walls, windows, rooms, or other subsets of the building space, leading to inputs of data relating to IBEs in that subset of the building space.

Revenue Generation

In this section, methods for generating revenue based upon energy savings are discussed. The system can generate revenue through a number of mechanisms. One source of revenue can be through agreements with a utility in a geographical area. The utility in the agreement can provide compensation for demonstrated energy use reductions attributable to the system in its service area.

Operators of the system can negotiate with the utility how long they should be compensated for the energy savings attributable to improved building efficiency. Generally, the negotiation can depend on the expected useful life of the efficiency improvements driven by the system. The compensation can be based on the reduction of different fuel types or it can be based on demand reductions. A number of different mechanisms can be employed to calculate the energy savings associated with the use of the system. A few potential calculation methodologies are outlined as follows.

In a first method, a jurisdiction wide comparison is generated. The energy use of a set of buildings, perhaps at the scale of all new construction within a jurisdiction or within multiple jurisdictions, can be compared between two cases. The first case can be those buildings built with the use of the system in a "system jurisdiction." A jurisdiction using the energy regulation enforcement system described above can be referred to as a system jurisdiction. It can be a city, county, or other political subdivision with responsibility for enforcement of energy regulations that uses the system tools. A system jurisdiction may be a time specific definition as well as a location specific definition, such that the term only applies to the actions within a jurisdiction in the period which the system is being utilized.

The second case can be buildings built without the use of the system, which would be the counterfactual jurisdiction. A counterfactual jurisdiction can be a city, county, or other political subdivision with responsibility for enforcement of energy regulations that does not use the energy regulation enforcement system. The energy performance of buildings in the counterfactual jurisdiction can be measured. These measurements can define the baseline of energy performance from which system jurisdictions—and in turn energy regulation enforcement system itself—are evaluated. A counterfactual jurisdiction is a time specific definition as well as a location specific definition, such that the term applies to the buildings constructed within a jurisdiction in the period before energy regulation enforcement system is utilized in the jurisdiction.

An example of two such jurisdictions is shown in FIG. 9, which is a plot 900 of average energy usage intensity as a function of time for the two jurisdictions. As described above, a system jurisdiction can be defined both by a jurisdictional boundary and by a time period—specifically the time during which system was used to assist with the enforcement of the energy code. For example, City A can be a counterfactual jurisdiction in the year 2013 before energy regulation enforcement system is deployed. If City A starts using the system in 2014, it can become a system Jurisdiction by 2015. Continuing the examples, if City B did not use the energy regulation enforcement system in 2015, it can be considered a contemporaneous counterfactual jurisdiction in 2015.

To measure the energy savings associated with the system, the energy use of buildings constructed in a system jurisdiction can be compared to the energy use of buildings constructed in a counterfactual jurisdiction. Those comparisons can be both before and after the adoption of system within a single jurisdiction (although multiple such comparisons could be made in different jurisdictions) and contemporaneously between jurisdictions. For contemporaneous comparisons between different jurisdictions, the system counterfactual would be a jurisdiction that is as similar in weather and as similar in building patterns as the system jurisdiction being analyzed.

In one embodiment, comparisons are made on a per square foot (or similar metric unit) basis. Residential comparisons can be made separately from nonresidential comparisons. Comparisons between different years, such as a before and after scenario for a given jurisdiction, can be normalized for weather variations from year to year.

A second method of assessing the energy savings attributable to system can use more detailed information on the buildings impacted by the system. It can also use more information on those buildings not impacted by system in a counterfactual jurisdiction. This methodology can use the same potential set of system jurisdictions and counterfactual jurisdictions as is described in the first method.

The method can assesses the performance of system by comparing the difference between the predicted energy use for a building using an energy model and the measured energy use of the same building using a meter. This comparison can create a "metered to modeled delta." Such "metered to modeled deltas" are created both for the buildings in the system jurisdiction and for buildings in the counterfactual jurisdiction. They are reduced to per square foot values (or a similar metric), separated by commercial values and residential values. Further distinctions can be made in the comparison, such as separating office buildings from food service buildings.

As an example, FIG. 10 is a plot 910 of energy usage intensity for different buildings and the energy usage determined from energy modeling and energy metering data. The system jurisdiction average "metered to modeled delta" is compared to a counterfactual jurisdiction average "metered to modeled delta" to produce a difference between the two deltas. The difference between the two deltas is representative of the energy savings attributable to system through the second calculation methodology. In creating the "metered to modeled delta", the energy modeling side of the analysis uses weather inputs that match those observed for the location when the metered energy use is recorded.

FIG. 11 is a plot 920 of energy usage intensity for different buildings and the energy usage determined from energy modeling and metering data. Where short interval meter data is available, such as 15 minute or 1 hour interval data, the interval data can be used to disaggregate energy uses within a building between subsystem loads, such as HVAC energy use 925, lighting energy use 930, and other subsets of energy use 935 and 940. The energy uses within a building can be separated from the whole building meter readings using a methodology known as inverse modeling or other methodologies. The subsets of metered building energy use, isolated using inverse modeling or other methodologies, are compared to similar subsets of building energy use from the energy models. Using these datasets, "modeled to metered deltas" applicable to sub-loads of the building are compared between system jurisdictions and counterfactual jurisdictions.

Another assessment methodology can look at temporal shifts in average attributes of energy efficiency installation as demonstrated through the inspection data collected by the system. As average installation modes shift, the energy savings projected to occur through such shifts can be estimated using energy modeling tools. Again, these projected energy savings can be used as part of a revenue sharing model.

In summary, the system may use all of these measures and others, in combination or in isolation, to assess the energy savings that are attributable to the use of system in the energy regulation enforcement process. In one embodiment, energy savings from the use of the system can provide some basis for compensating the system operators. Other revenue models may be employed, such as charging a per project cost or per square-foot fee for all buildings that are constructed using the energy regulation enforcement system. License fees may also be used with jurisdictions or utilities.

Embodiments of the present invention further relate to computer readable media that include executable program instructions for performing recruiting techniques described herein. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A method for enforcing building energy regulations in an electronic system, the method comprising:
    receiving by a processor an energy model for a building wherein the energy model specifies building components of the building selected to comply with energy regulations of a building jurisdiction submitted as part of a permitting process prior to construction of the building and associated with an approved building plan for the building;
    determining by the processor a set of inspectable building elements for the building using the received energy model wherein each of the inspectable building elements specify one or more first building components in accordance with the approved building plan;
    for each inspectable building element in the set of inspectable building elements, a) determining, by the processor, first energy values associated with the one or more first building components specified in the approved building plan and b) determining, by the processor, second energy values associated with one or more second building components, different from the one or more first building components, selected to not comply with the energy regulations of the building jurisdiction;
    based upon the first energy values and the second energy values determined for each inspectable building element, prioritizing by the processor the set of inspectable building elements;
    based upon the prioritization of the inspectable building elements, selecting by the processor a first portion of the inspectable building elements from among the set of inspectable building elements;
    randomly selecting by the processor a second portion of the inspectable building elements from among the set of inspectable building elements;
    based upon the first portion and the second portion of the inspectable building elements, generating by the processor a list of inspectable building elements;
    determining by the processor a location in a plan view of the approved building plan of each of the inspectable building elements from the list of inspectable building elements; and
    during a construction phase of the building, outputting by the processor to a display a plan view of the approved building plan and the location on the plan view of each of the inspectable building elements from the list of inspectable building elements to enable a building inspector to perform a field inspection of the building under construction.

2. The method of claim 1, further comprising: based upon the first energy values and the second energy values, determining an amount of energy saved and a value of the amount of energy saved.

3. The method of claim 1, wherein the list of inspectable building elements is additionally prioritized according to a time required by the building inspector to save a given unit of energy.

4. The method of claim 1, further comprising: determining an amount of inspection time needed to perform an inspection of each of the inspectable building elements.

5. The method of claim 4, wherein the list is additionally prioritized according to the determined amount of inspection time.

6. The method of claim 1, further comprising: receiving first information related to an inspection of one or more of the inspectable building elements on the list and based upon the first information determining a first value of a compliance score wherein the compliance score measures a degree of compliance of the one or more inspectable building elements with the approved building plan.

7. The method of claim 6, further comprising: receiving second information related to the inspection of the one or more inspectable building elements from a second field inspection and determining a second value of the compliance score.

8. The method of claim 1, further comprising: during the field inspection, receiving answers to one or more hierarchal questions associated with a first inspectable building element on the list of inspectable building elements and based upon the answers determining whether the first inspectable building element complies with an energy regulation.

9. The method of claim 8, wherein the one or more hierarchal questions are output to a mobile device and the answers are received from the mobile device.

10. The method of claim 1, further comprising: receiving the energy model in a first file format and converting it to a second file format.

11. The method of claim 1, further comprising: generating the energy model for a second building.

12. The method of claim 1, further comprising: receiving information related to a building component actually installed in the building.

13. The method of claim 12, further comprising: determining an energy value for an inspectable building element based upon the received information.

14. The method of claim 13, further comprising: comparing the energy for the inspectable building element to an energy value determined prior to receiving the information.

15. The method of claim 1, further comprising: based upon the first energy values and the second energy values determined for each of the inspectable building elements, determining a total energy saved for the building.

16. The method of claim 15, further comprising: determining a value of the total energy saved for the building over a time period.

17. The method of claim 1, wherein the list of inspectable building elements include all of the inspectable building elements in the set.

18. The method of claim 1,
prior to receiving the approved building plan, receiving by the processor a second energy model for a building wherein the second energy model specifies third building components of the building selected to comply with energy regulations of a building jurisdiction submitted as part of a permit submission process prior to construction of the building and associated with a submitted building plan for the building;
determining by the processor a set of second inspectable building elements for the building using the received second energy model wherein each of the second inspectable building elements specify one or more third building components in accordance with the submitted building plan;
for each second inspectable building element in the set of second inspectable building elements, a) determining, by the processor, third energy values associated with the one or more third building components specified in the submitted building plan and b) determining, by the processor, fourth energy values associated with one or more fourth building components, different from the one or more third building components, selected to not comply with the energy regulations of the building jurisdiction;
based upon the third energy values and the fourth energy values determined for each second inspectable building element, prioritizing by the processor the set of second inspectable building elements;
based upon the prioritization of the second inspectable building elements, selecting by the processor a first portion of the second inspectable building elements from among the set of second inspectable building elements;
randomly selecting by the processor a second portion of the second inspectable building elements from among the set of second inspectable building elements; and
based upon the first portion and the second portion of the second inspectable building elements, generating by the processor a list of second inspectable building elements.

* * * * *